United States Patent
Amano et al.

(10) Patent No.: US 8,340,849 B2
(45) Date of Patent: Dec. 25, 2012

(54) HYBRID VEHICLE CONTROLLER

(75) Inventors: Yasushi Amano, Aichi-gun (JP); Takaji Umeno, Nisshin (JP); Shuji Tomura, Nagoya (JP); Tetsuhiro Ishikawa, Toyota (JP); Naoya Kanada, Nishikamo-gun (JP); Hiroshi Yoshida, Anjyo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1012 days.

(21) Appl. No.: 12/223,824

(22) PCT Filed: Feb. 21, 2007

(86) PCT No.: PCT/JP2007/053695
§ 371 (c)(1),
(2), (4) Date: Aug. 11, 2008

(87) PCT Pub. No.: WO2007/097464
PCT Pub. Date: Aug. 30, 2007

(65) Prior Publication Data
US 2009/0030568 A1    Jan. 29, 2009

(30) Foreign Application Priority Data
Feb. 21, 2006    (JP) .................. 2006-043750

(51) Int. Cl.
*B60L 11/00*    (2006.01)
*B60W 10/00*    (2006.01)
(52) U.S. Cl. .................. 701/22; 180/65.265
(58) Field of Classification Search ............ 701/22, 701/35, 208, 211, 213, 300; 180/65.21, 65.1–65.8; 340/995.1, 995.19
See application file for complete search history.

(56) References Cited

U.S. PATENT DOCUMENTS

| | | | |
|---|---|---|---|
| 5,939,794 A | * | 8/1999 | Sakai et al. ............. 290/40 A |
| 6,314,347 B1 | * | 11/2001 | Kuroda et al. ........... 701/22 |
| 2002/0069000 A1 | | 6/2002 | Nakao |
| 2005/0228553 A1 | | 10/2005 | Tryon |

FOREIGN PATENT DOCUMENTS

| | | |
|---|---|---|
| JP | 2000333305 | * 11/2000 |
| JP | A-2004-060498 | 2/2004 |
| JP | A-2004-248455 | 9/2004 |
| JP | B2-3654048 | 3/2005 |
| JP | A-2005-146966 | 6/2005 |
| JP | A-2005-291320 | 10/2005 |

OTHER PUBLICATIONS

Jan. 25, 2010 Office Action issued in Russian Patent Application No. 2008137255/11 (with translation).
Sep. 10, 2012 Office Action issued in U.S. Appl. No. 13/067,648.

* cited by examiner

*Primary Examiner* — James Trammell
*Assistant Examiner* — Muhammad Shafi
(74) *Attorney, Agent, or Firm* — Oliff & Berridge, PLC

(57) ABSTRACT

A power frequency distribution predicting unit predicts the power frequency distribution of a vehicle in a case where the vehicle travels a route with reference to the history of the vehicle power Pv when the vehicle traveled the route in the past. An operation condition setting unit sets the range of the required vehicle power Pv0 to operate the engine as an engine operation condition for controlling the energy balance between generated power and generated electric power of an electric rotating machine in a case where the vehicle travels the route to be at a preset value according to the power frequency distribution predicted by the power frequency distribution predicting unit. An operation control unit controls the operation of the engine according to the range of the required vehicle power Pv0 to operate the engine set by the operation condition setting unit.

14 Claims, 12 Drawing Sheets

HYBRID VEHICLE CONTROLLER

TECHNICAL FIELD

The present invention relates to a hybrid vehicle controller, and more particularly, to a controller used in a hybrid vehicle capable of driving the drive wheels using power generated by at least one of the engine and the electric rotating machine and generating electric power by means of the electric rotating machine using power generated by the engine.

BACKGROUND ART

A related art of a hybrid vehicle controller of this type is disclosed in JP 3654048 B (hereinafter, referred to as Patent Document 1). The hybrid vehicle controller according to Patent Document 1 includes: path searching means for searching a path to the destination; road condition detecting means for detecting the road condition of the path; path dividing means for dividing the path into plural zones at points where starting and stopping are predicted; driving history recording means for recording therein a driving history of the driver; vehicle speed estimating means for estimating a vehicle speed pattern for each zone with reference to the road condition and the driving history; and operation schedule setting means for setting operation schedules for the engine and the motor for each zone according to the vehicle speed pattern and the fuel consumption characteristic of the engine so as to minimize a fuel consumption amount to the destination. The operation schedule setting means compares a fuel consumption amount resulting from a first operation schedule, according to which the vehicle travels by operating the motor in a zone where the operation efficiency of the engine becomes low (hereinafter, referred to as the low efficiency zone) while the battery is charged by driving the motor to generate electric power using a power, which is a difference when a power need for the travel is subtracted from a power of the engine, by making the power of the engine larger than the output needed for the travel by shifting the operation point of the engine in the other zones such that the operation efficiency is increased, with a fuel consumption amount resulting from a second operation schedule, according to which the vehicle travels by operating the engine alone in the low efficiency zone and the other zones, and chooses the first operation schedule in a case where the fuel consumption amount resulting from the first operation schedule is smaller than the fuel consumption amount resulting from the second schedule. Accordingly, the operation schedules for the engine and the motor are set so as to minimize the fuel consumption amount of the engine in response to the road condition of the route to the destination.

According to Patent Document 1, in a case where the first operation schedule is chosen, whether the vehicle travels by operating the motor or by operating the engine is set for each of the zones divided at points at which starting and stopping are predicted. However, in a case where a region where the vehicle requirement power is low and a region where the vehicle requirement power is high are present together in the same zone, it becomes difficult to set the operation schedules for the engine and the motor appropriately. For example, either the vehicle travels using a power of the engine even in a region in which the operation efficiency of the engine is low, or the vehicle travels using a power of the motor even in a region in which the operation efficiency of the engine is high. Also, according to the method for setting whether the vehicle travels by operating the motor or by operating the engine on a zone by zone basis for the path divided into plural zones, the setting made in one zone affects the other zones. Accordingly, either a massive volume of computation is required to set the operation schedules for the engine and the motor appropriately for the entire route, or it becomes impossible to achieve the most appropriate operation schedules for the engine and the motor for the entire route.

DISCLOSURE OF THE INVENTION

The invention provides a hybrid vehicle controller capable of controlling the operation of the engine more appropriately.

A hybrid vehicle controller of the invention is a controller used in a hybrid vehicle capable of driving drive wheels using power generated by at least one of an engine and an electric rotating machine, and capable of generating electric power of the electric rotating machine using the power generated by the engine, and characterized by including: an operation control unit that controls operations of the engine and the electric rotating machine according to required vehicle power; a power frequency distribution predicting unit that predicts a power frequency distribution of the vehicle in a case where the vehicle travels a route; and an operation condition setting unit that sets an engine operation condition to control an energy balance between generated power and generated electric power of the electric rotating machine in a case where the vehicle travels the route so as to fall within a preset range according to the power frequency distribution predicted by the power frequency distribution predicting unit, wherein the operation control unit controls an operation of the engine according to the engine operation condition set by the operation condition setting unit.

Also, another hybrid vehicle controller of the invention is a controller used in a hybrid vehicle capable of driving drive wheels using power generated by at least one of an engine and an electric rotating machine and capable of generating electric power of the electric rotating machine using the power generated by the engine, and is characterized in that the electric rotating machine is capable of sending electric power to, and receiving the electric power from, an electric energy storage device that stores electric energy, and that the hybrid vehicle controller includes: an operation control unit that controls operations of the engine and the electric rotating machine according to required vehicle power; a power frequency distribution predicting unit that predicts a power frequency distribution of the vehicle in a case where the vehicle travels a route; an electric energy storage state acquiring unit that acquires an electric energy storage state of the electric energy storage device; and an operation condition setting unit that sets an engine operation condition for the electric energy storage state of the electric energy storage device after the vehicle has traveled the route so as to fall within a preset range according to the power frequency distribution predicted by the power frequency distribution predicting unit and the electric energy storage state of the electric energy storage device acquired by the electric energy storage state acquiring unit, wherein the operation condition unit controls an operation of the engine according to the engine operation condition set by the operation condition setting unit.

According to the invention, by predicting the power frequency distribution of the vehicle in a case where the vehicle travels the route and controlling the operation of the engine for the energy balance between generated power and generated electric power of the electric rotating machine in a case where the vehicle travels the route so as to fall within the preset range according to the predicted power frequency distribution, it is possible to control the operation of the engine more appropriately.

Also, according to the invention, by predicting the power frequency distribution of the vehicle in a case where the vehicle travels the route and controlling the operation of the engine for the electric energy storage state of the electric energy storage device after the vehicle has traveled the route so as to fall within the preset range according to the predicted power frequency distribution, it is possible to control of the operation of the engine more appropriately.

BEST MODE FOR CARRYING OUT THE INVENTION

Figure 1:
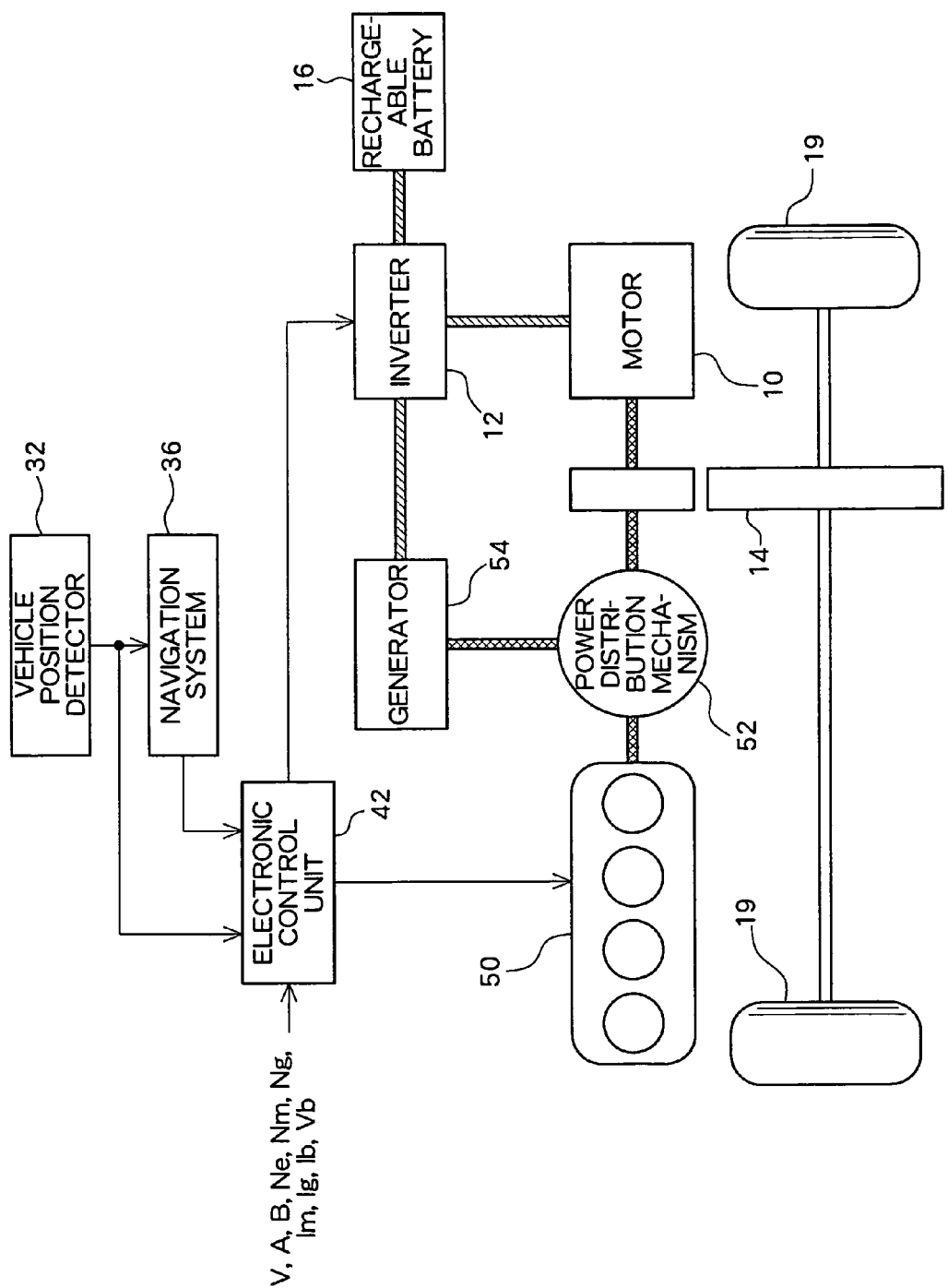
FIG. 1 is view schematically showing the configuration of a hybrid vehicle including a controller according to one embodiment of the invention.

Hereinafter, a preferred embodiment of the invention will be described in accordance with the drawings. FIG. 1 is a view schematically showing the configuration of a hybrid vehicle including a controller according to one embodiment of the invention. An output shaft of an engine (internal combustion) 50 capable of generating power is coupled to a power distribution mechanism 52. Besides the output shaft of the engine 50, an input shaft of a speed reducer 14 and a rotator of a generator (power generating machine) 54 capable of generating electric power are also coupled to the power distribution mechanism 52. The power distribution mechanism 52 referred to herein can be formed, for example, of a planetary gear mechanism having a ring gear, a carrier, and a sun gear. The output shaft of the speed reducer 14 is coupled to the drive wheels 19. The power distribution mechanism 52 distributes power from the engine 50 to the drive wheels 19 and the generator 54. The power distributed to the drive wheels 19 from the power distribution mechanism 52 is used to drive the vehicle. Meanwhile, the power distributed to the generator 54 from the power distribution mechanism 52 is converted to generated electric power of the generator 54. It is possible to supply the generated electric power of the generator 54 to a motor 10 capable of generating power via an inverter 12 (power converter). It is also possible to accumulate the generated electric power of the generator 54 in a rechargeable battery 16 via the inverter 12. Further, it is possible to start the engine 50 by generating power by the generator 54.

Electric power from the rechargeable battery 16 provided as an electric energy storage device to store electric energy therein is supplied to the winding wire of the motor 10 after it is subjected to power conversion (converted from direct current to alternating current) by the inverter 12. The motor 10 converts the electric power supplied to the winding wire via the inverter 12 to power of the rotator. The rotator of the motor 10 is coupled to the input shaft of the speed reducer 14, and the power of the motor 10 is transmitted to the drive wheels 19 after the speed is reduced by the speed reducer 14 and used to drive the vehicle. In addition, the power of the drive wheels 19 (the vehicle) may be converted to generated electric power of the motor 10 by a regenerative operation of the motor 10 so as to be accumulated in the rechargeable battery 16 via the inverter 12. As has been described, the hybrid vehicle of this embodiment is provided with the motor 10 capable of driving the drive wheels 19 and the generator 54 capable of generating electric power using power generated by the engine 50 as an electric rotating machine. The electric rotating machine (the motor 10 and the generator 54) is capable of receiving electric power from, and sending electric power to, the rechargeable battery 16. It is possible to drive the drive wheels 19 (the vehicle) using power generated by at least one of the engine 50 and the electric rotating machine (the motor 10). Further, it is possible to generate electric power by means of the electric rotating machine (the generator 54) using the power generated by the engine 50.

A vehicle position detector 32 detects the current position of the vehicle using, for example, the GPS, and outputs a signal specifying the current position of the vehicle to a navigation system 36 and an electronic control unit 42. The navigation system 36 pre-stores road map data in a map database. It reads out the road map in the vicinity of the current position of the vehicle from the map database and displays this road map on the screen together with the current position of the vehicle. In a case where an operator inputs the destination of the vehicle, the navigation system 36 sets a route of the vehicle according to the current position of the vehicle (departure place) and the destination of the vehicle and displays the route on the screen. The navigation system 36 outputs a signal indicating the route of the vehicle to the electronic control unit 42.

The electronic control unit 42 is formed as a micro processor having a CPU that plays a central role, and includes a ROM that has pre-stored therein a processing program, a RAM that temporarily stores therein data, and input and output ports. Signals, such as a signal indicating a vehicle speed V detected, a signal indicating an accelerator opening A, a signal indicating a brake operation amount B, a signal indicating a rotational speed Ne of the engine 50, a signal indicating a rotational speed Nm of the motor 10, a signal indicating a rotational speed Ng of the generator 54, a signal indicating a current Im of the motor 10, a signal indicating the current Ig of the generator 54, a signal indicating the current Ib of the rechargeable battery 16, and a signal indicating a voltage Vb of the rechargeable battery 16 by an unillustrated sensor, are inputted into the electronic control unit 42 via the input port. Further, signals, such as a signal specifying the current position of the vehicle from the vehicle position detector 32 and a signal indicating the route of the vehicle from the navigation system 36, are also inputted to the electronic control unit 42 via the input port. Meanwhile, signals, such as an engine control signal to control the operation of the engine 50, a motor control signal to control the operation of the motor 10, and a generator control signal to control the operation of the generator 54, are outputted from the electronic control unit 42 via the output port.

Figure 2:
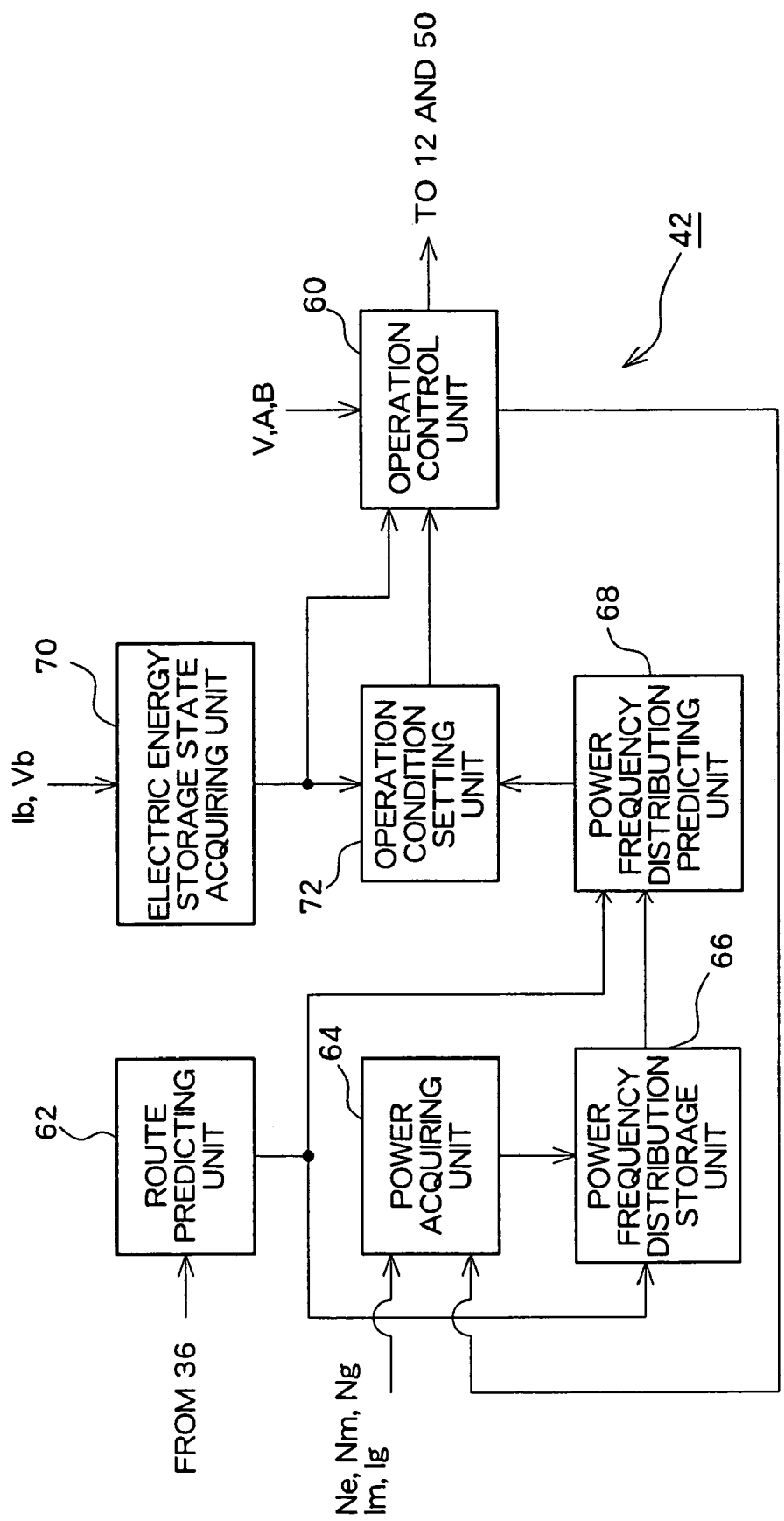
FIG. 2 is a view showing an example of the configuration of an electronic control unit.

The electronic control unit 42 can be formed, for example, by the functional block diagram as is shown in FIG. 2. The electronic control unit 42 includes an operation control unit 60, a route predicting unit 62, a power acquiring unit 64, a power frequency distribution storage unit 66, a power frequency distribution predicting unit 68, an electric energy storage state acquiring unit 70, and an operation condition setting unit 72, all of which will be described below.

Figure 3:
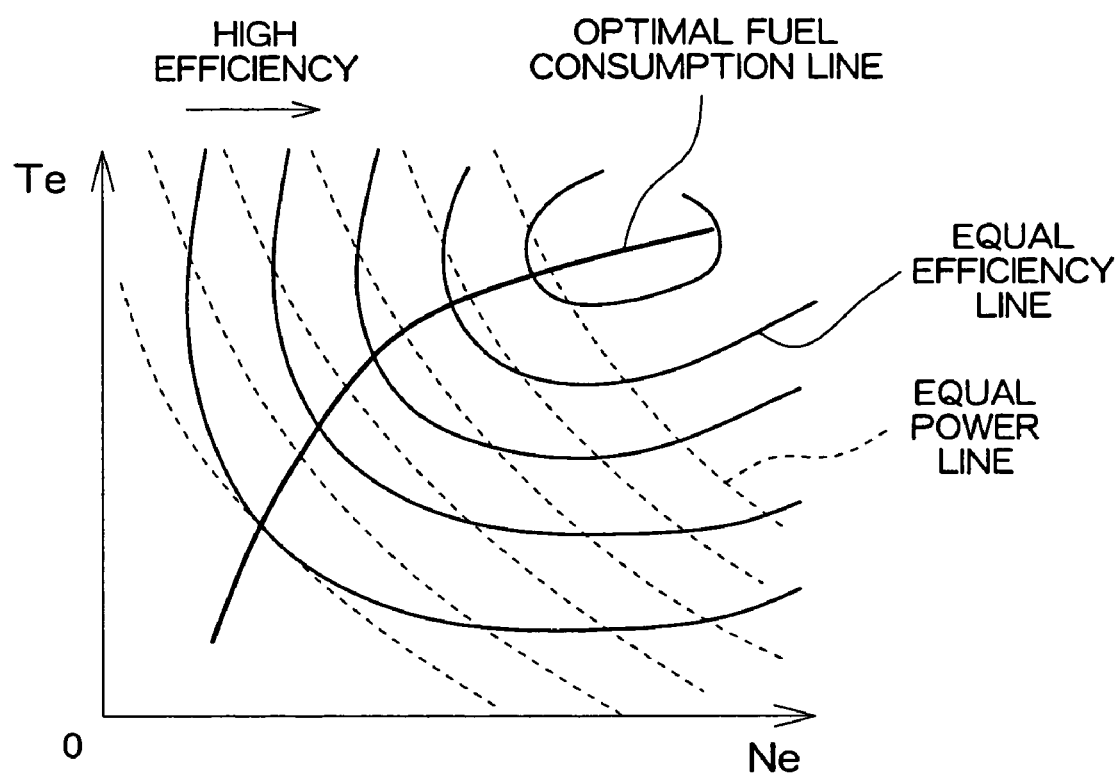
FIG. 3 is a view used to describe an optimal fuel consumption line of an engine.

The operation control unit 60 sets required vehicle power Pv0 according, for example, to the accelerator opening A, the brake operation amount B, and the vehicle speed V. The operation control unit 60 controls operations of the engine 50 and the electric rotating machine (the motor 10 and the generator 54) according to the required vehicle power Pv0. The operations of the motor 10 and the generator 54 can be controlled by controlling the switching operations of a switching element of the inverter 12. Also, the operation of the engine 50 while the engine 50 is generating power is controlled in such a manner so as to maintain a state where the rotational speed Ne and torque Te of the engine 50 are positioned, for example, on (or almost on) an optimal fuel consumption line shown in FIG. 3 (a line linking points at which the efficiency becomes the highest for the engine power supplied).

The route predicting unit 62 predicts a route of the vehicle. Herein, it is possible to predict a route in a case where the vehicle travels the route from the departure point to the destination from the route set by the navigation system 36.

The power acquiring unit 64 acquires vehicle power (travel power) Pv in a case where the vehicle travels the route from the departure point to the destination. Herein, the power Pv of the vehicle (the drive wheels 19) can be estimated, for example, from the required vehicle power Pv0 set by the operation control unit 60. It is also possible to detect the power Pv of the vehicle (the drive wheels 19) according to the rotational speed Ne and the torque Te of the engine 50, the rotational speed Nm and the torque Tm of the motor 10, and the rotational speed Ng and the torque Tg of the generator 54. The torque Te of the engine 50 can be estimated according, for example, to a throttle opening C and the engine rotational speed Ne detected by an unillustrated sensor. The torque Tm of the motor 10 and the torque Tg of the generator 54 can be estimated, respectively, for example, from the current Im of the motor 10 and the current Ig of the generator 54 detected by unillustrated corresponding sensors.

Figure 4:
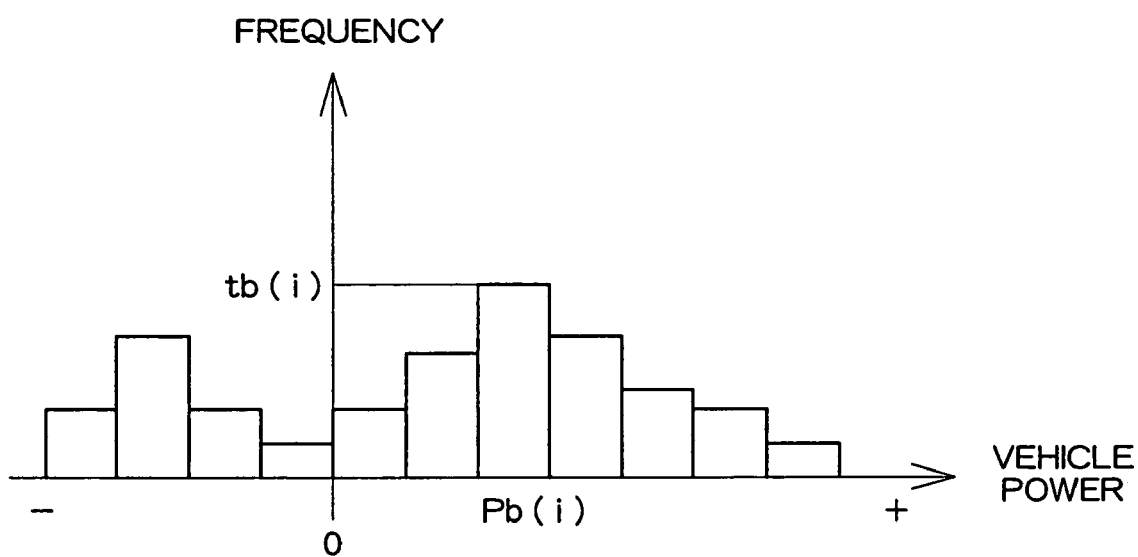
FIG. 4 is a view showing one example of a power frequency distribution of a vehicle.

The power frequency distribution storage unit 66 stores (accumulates) a power frequency distribution of the vehicle (the vehicle power (traveling power) and the frequency of use (time) thereof). The power frequency distribution of the vehicle referred to herein can be expressed, for example, as is shown in FIG. 4, by times (frequencies) tb(i) included in respective power bandwidths (traveling power bandwidths) Pb(i) (i is a natural number), which are the vehicle power Pv acquired by the power acquiring unit 64 that is divided into plural bandwidths in advance. The power frequency distribution storage unit 66 stores the value of tb(i) for each power bandwidth Pb(i). The power frequency distribution storage unit 66 stores the power frequency distribution (the value of the frequency tb(i) in each power bandwidth Pb(i)) in correlation with the route of the vehicle. Further, the power frequency distribution stored in the power frequency distribution storage unit 66 is updated according to the vehicle power Pv acquired by the power acquiring unit 64. To be more concrete, in the power frequency distribution corresponding to the route of the vehicle predicted by the route predicting unit 62, the value of the frequency tb(i) corresponding to the power bandwidth Pb(i) including the vehicle power Pv is updated while the vehicle is traveling. As has been described, the power frequency distribution of the vehicle with reference to the history of the vehicle power Pv acquired by the power acquiring unit 64 is stored (accumulated) in the power frequency distribution storage unit 66.

The power frequency distribution predicting unit 68 predicts the power frequency distribution of the vehicle in a case where the vehicle travels the route from the departure place to the destination. Herein, the power frequency distribution (the value of the frequency tb(i) in each power bandwidth Pb(i)) corresponding to the route of the vehicle predicted by the route predicting unit 62 is read out from the power frequency distribution storage unit 66, and the power frequency distribution thus read out is used as the predicted power frequency distribution. In other words, in a case where the vehicle travels the route from the departure point to the destination, the power frequency distribution predicting unit 68 predicts the power frequency distribution (the value of the frequency tb(i) in each power bandwidth Pb(i)) of the vehicle with reference to the history of the vehicle power Pv acquired by the power acquiring unit 64 when the vehicle traveled the route in the past.

The electric energy storage state acquiring unit 70 acquires a state of charge (SOC) in the rechargeable battery 16, that is, a remaining battery capacity of the rechargeable battery 16, as the electric energy storage state of the electric energy storage device. Herein, the SOC (remaining battery capacity) of the rechargeable battery 16 can be estimated, for example, according to the current Ib and the voltage Vb of the rechargeable battery 16 detected by unillustrated sensors.

The operation condition setting unit 72 sets an engine operation condition to control a charge-discharge balance of the rechargeable battery 16 in a case where the vehicle travels the route from the departure point to the destination, that is, an energy balance between generated power and generated electric power of the electric rotating machine (the motor 10 and the generator 54), to be at a preset value (or to fall within a preset range). Herein, the range of the required vehicle power Pv0 (the lower limit value Pc of the range) to operate the engine 50 is set as the engine operation condition using the power frequency distribution predicted by the power frequency distribution predicting unit 68 (the value of the frequency tb(i) in each power bandwidth Pb(i)) and the SOC (the remaining battery capacity) of the rechargeable battery 16 acquired by the electric energy storage state acquiring unit 70. A method of setting the range of the required vehicle power Pv0 to operate the engine 50 (the engine operation condition) will be described below in detail.

The operation control unit 60 then controls the operation of the engine 50 according to the range of the required vehicle power Pv0 to operate the engine 50 (the engine operation condition) set by the operation condition setting unit 72. To be more concrete, when the required vehicle power Pv0 is larger than 0 and smaller than the lower limit value Pc of the range set by the operation condition setting unit 72, the operation control unit 60 stops the operation of the engine 50. In short, it controls the engine 50 so as to generate no power. In this instance, the operation control unit 60 generates power by means of the motor 10 and controls the EV (Electric Vehicle) travel by which the vehicle (the drive wheels 19) is driven by the power of the motor 10. Meanwhile, when the required vehicle power Pv0 falls within the range set by the operation condition setting unit 72 (equal to or larger than the lower limit value Pc of the range), the operation control unit 60 controls the engine 50 to operate. In other words, it controls the engine 50 so as to generate power and drives the vehicle (the drive wheels 19) using the power of the engine 50. In this instance, it is possible to convert some of the power (traveling power) of the engine 50 to the generated electric power of the generator 54 so as to be accumulated in the rechargeable battery 16. In addition, when the required vehicle power Pv0 takes a negative value (while the vehicle is decelerating by putting the brake on), the operation control unit 60 controls the motor 10 to operate regeneratively, so that power (traveling power) of the drive wheels 19 (the vehicle) is converted to the generated electric power of the motor 10 and accumulated in the rechargeable battery 16.

An operation in a case where the vehicle travels from the departure point to the destination will now be described using the flowchart of FIG. 5.

Initially, in Step S1, when the ignition is turned on by the driver to start the vehicle, an ignition-on signal is read. Subsequently, in Step S2, the destination of the vehicle is inputted by the driver. The route of the vehicle from the departure point to the destination is then set by the navigation system 36 and the route of the vehicle is predicted by the route predicting unit 62. Subsequently, In Step S3, the power frequency distribution corresponding to the route of the vehicle predicted in Step S2 is read out from the power frequency distribution storage unit 66, so that the power frequency distribution in a case where the vehicle travels the route from the departure point to the destination is predicted by the power frequency distribution predicting unit 68 with reference to the history of the vehicle power Pv when the vehicle traveled the route in the past. Then, the lower limit value Pc of the range of the required vehicle power Pv0 necessary to operate the engine 50 (the engine operation condition) is set by the operation condition setting unit 72 according to the power frequency distribution predicted by the power frequency distribution predicting unit 68. In a case where there is no history of the vehicle power Pv when the vehicle traveled in the past in Step S3, the lower limit value Pc predetermined as the reference is set by the operation condition setting unit 72.

In Step S4, the vehicle power Pv is acquired by the power acquiring unit 64 while the vehicle is traveling from the departure point to the destination, and the power frequency distribution stored (accumulated) in the power frequency distribution storage unit 66 is updated according to the vehicle power Pv thus acquired. To be more concrete, the vehicle power Pv acquired by the power acquiring unit 64 is subjected to filtering to remove noise. Then, in the power frequency distribution corresponding to the route of the vehicle predicted by the route predicting unit 62, the value of the frequency tb(i) corresponding to the power bandwidth Pb(i) including the filtered vehicle power Pfv is updated. The filtered vehicle power Pfv is expressed, for example, by Equation (1) below. In Equation (1) below, a is a time constant and $z^{-1}$ is a time-lag operator.
(Mathematical Formula 1)

$$Pfv = (1-a/1-a \cdot z^{-1}) \cdot Pv \quad (1)$$

In Step S5, whether the state of charge (SOC) of the rechargeable battery 16 acquired by the electric energy storage state acquiring unit 70 falls within the specified range (for example, a range of 50% to 70% both inclusive) is determined by the operation control unit 60 while the vehicle is traveling from the departure point to the destination. In a case where it is determined in Step S5 that the SOC of the rechargeable battery 16 falls within the specified range, the operation control unit 60 controls the operation of the engine 50 in Step S6 according to the range of the required vehicle power Pv0 to operate the engine 50 (under the engine operation condition) set by the operation condition setting unit 72. In a case where it is determined that the required vehicle power Pv0 is larger than 0 and smaller than the lower limit value Pc set by the operation condition setting unit 72, the operation control unit 60 stops the operation of the engine 50 (controls the engine 50 to generate no power), and executes the EV travel by which the vehicle is driven by the power of the motor 10. In this instance, the operation control unit 60 controls the operation of the motor 10 in such a manner that power generated by the motor 10 becomes equal to the required vehicle power Pv0. In a case where it is determined that the required vehicle power Pv0 is equal to or larger than the lower limit value Pc, the operation control unit 60 controls the engine 50 to operate (controls the engine 50 to generate power). In this instance, the operation control unit 60 controls operations of the engine 50, the motor 10, and the generator 54 in such a manner that the rotational speed Ne and the torque Te of the engine 50 are positioned, for example, on the optimal fuel consumption line shown in FIG. 3 and the power of the vehicle (the drive wheels 19) becomes equal to the required vehicle power Pv0.

Meanwhile, in a case where it is determined in Step S5 that the SOC of the rechargeable battery 16 is lower than the lower limit value of the specified range (for example, 50%), the operation control unit 60 controls the engine 50 to operate (controls the engine 50 to generate power) in Step S6 independently of the range of the required vehicle power Pv0 to operate the engine 50 (the engine operation condition) set by the operation condition setting unit 72. By controlling the generator 54 to generate electric power using power of the engine 50 and collecting the generated electric power of the generate 54 in the rechargeable battery 16, the SOC of the rechargeable battery 16 is increased. The rechargeable battery 16 is kept charged using the power of the engine 50 until the SOC of the rechargeable battery 16 restores to fall within the specified range (for example, 55% or higher). In a case where it is determined in Step S5 that the SOC of the rechargeable batter 16 is higher than the upper limit value of the specified range (for example, 70%), the operation control unit 60 lowers the SOC of the rechargeable battery 16 in Step S6 by controlling the motor 10 to generate power by supping electric power from the rechargeable battery 16 to the motor 10. The rechargeable battery 16 is kept discharged in this manner until the SOC of the rechargeable battery 16 drops to fall within the specified range (for example, 65% or below).

Operations in Steps S4 through S6 as above are performed repetitively at predetermined time intervals while the vehicle travels from the departure point to the destination (until the vehicle arrives at the destination). After the arrival of the vehicle at the destination in Step S7 (the determination result is YES in Step S7), the ignition is turned off in Step S8.

Figure 6:
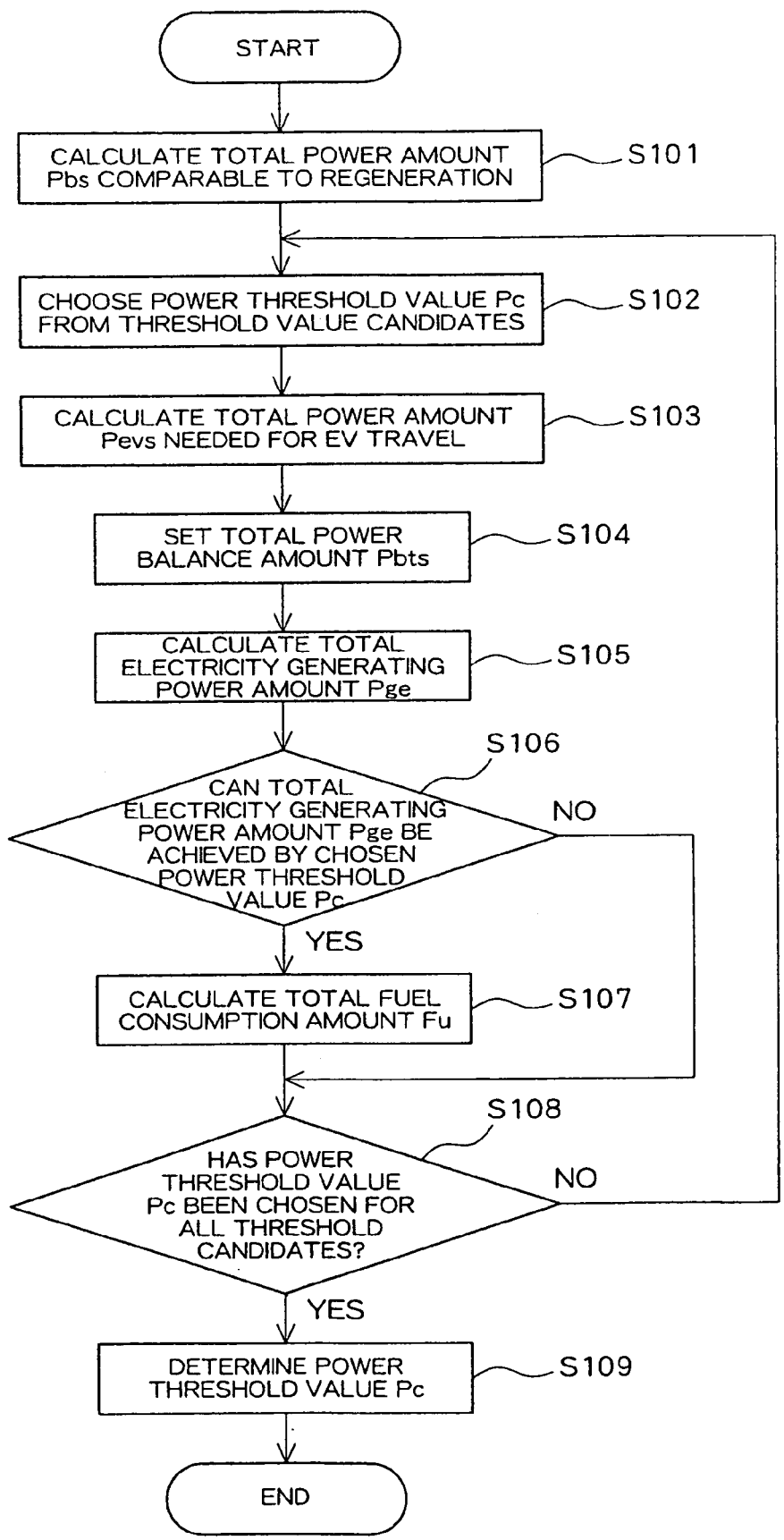
FIG. 6 is a flowchart detailing processing to set a lower limit value of a range of required vehicle power to operate the engine.

Processing to set the range (the lower value Pc) of the required vehicle power Pv0 to operate the engine 50 by the operation condition setting unit 72 in Step S3 will now be described in detail using the flowchart of FIG. 6.

Figure 7:
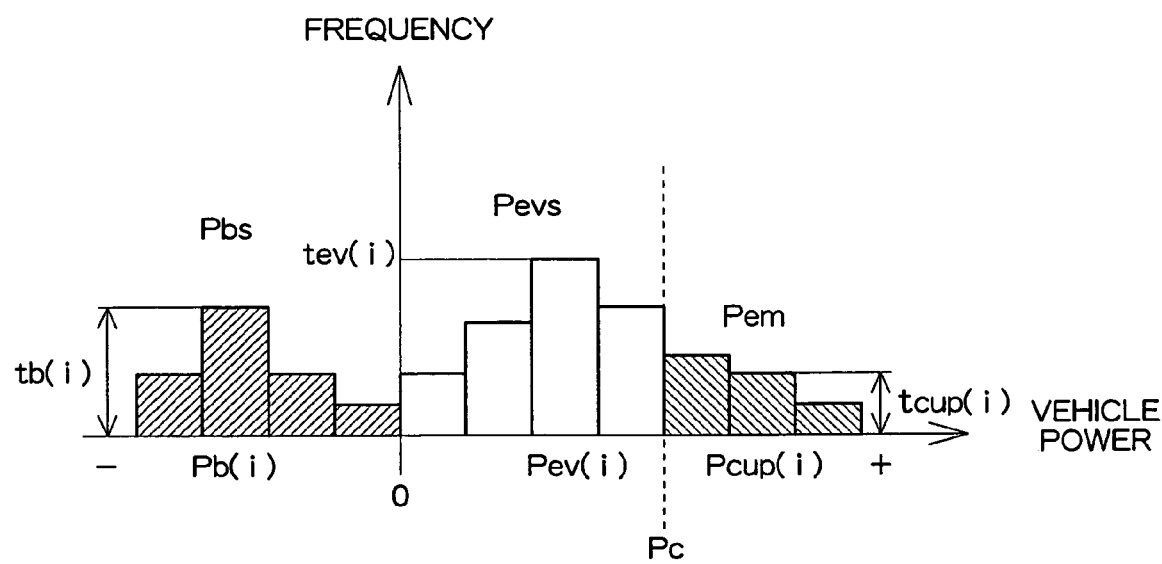
FIG. 7 is a view used to describe processing to set the lower limit value of the range of the required vehicle power to operate the engine using a power frequency distribution.

Initially, in Step S101, the operation condition setting unit 72 calculates a total power amount (a total power amount comparable to regeneration) Pbs to be accumulated in the rechargeable battery 16 by the regenerative operation of the motor 10 in a case where the vehicle travels the route from the departure point to the destination using the power frequency distribution (the power frequency distribution read out from the power frequency distribution storage unit 66) predicted by the power frequency distribution predicting unit 68. Herein, as is shown in FIG. 7, it is possible to calculate the total power amount Pbs comparable to regeneration using the negative power bandwidth Pb(i) and the frequency tb(i) thereof in the power frequency distribution. To be more concrete, the total power amount Pbs comparable to regeneration is calculated in accordance with Equation (2) below. In Equation (2) below, $\eta_1$ is a conversion coefficient that takes into account the efficiency until regenerative power is accumulated in the rechargeable battery 16.

(Mathematical Formula 2)

$$Pbs=\eta_1(\Sigma Pb(i)\times tb(i)) \quad (2)$$

Subsequently, in Step S102, the operation condition setting unit 72 tentatively sets the lower limit value (hereinafter, referred to as the power threshold value) Pc of the range of the required vehicle power Pv0 to operate the engine 50 by choosing one threshold value candidate from threshold candidates provided in a plural form, [Pc(1), Pc(2), . . . , and Pc(n)]. Subsequently, in Step S103, the operation condition setting unit 72 determines the range of the required vehicle power Pv0 to execute the EV travel by which the vehicle is driven by the power of the motor 10 by stopping the operation of the engine 50 from the power threshold value Pc that has been chosen (set tentatively). Herein, a range larger than 0 and smaller than the power threshold value Pc is set as the range of the required vehicle power Pv0 to execute the EV travel. The operation condition setting unit 72 then calculates a total power amount (a total power amount needed for the EV travel) Pevs to be supplied from the rechargeable battery 16 to the motor 10 in a case where the vehicle travels the route from the departure point to the destination using the power frequency distribution. Herein, as is shown in FIG. 7, it is possible to calculate the total power amount Pevs needed for the EV travel using the power bandwidth Pev(i) that is larger than 0 and smaller than the power threshold value Pc and the frequency tev(i) thereof. To be more concrete, the total power amount Pevs of the rechargeable battery 16 needed for the EV travel is calculated in accordance with Equation (3) below. In Equation (3) below, $\eta_2$ is a conversion coefficient that takes into account the efficiency until the power (electric power) of the rechargeable battery 16 is converted to the power (traveling power) of the motor 10.

(Mathematical Formula 3)

$$Pevs=\eta_2\Sigma Pev(i)\times tev(i) \quad (3)$$

Subsequently, in Step S104, the operation condition setting unit 72 sets a total power balance amount between generated power and generated electric power of the motor 10 and the generator 54 in a case where the vehicle travels the route from the departure point to the destination, that is, a total power balance amount (a charge-discharge balance amount) Pbts by charging and discharging the rechargeable battery 16. Herein, it is possible to set the total power balance amount Pbts of the rechargeable battery 16 from a deviation of a target SOC of the rechargeable battery 16 at the destination and the SOC (initial SOC) of the rechargeable battery 16 acquired by the electric energy storage state acquiring unit 70 at the departure point of this journey. Also, it is possible to set the total power balance amount Pbts of the rechargeable battery 16 from a deviation of the SOC of the rechargeable battery 16 acquired at the destination and the SOC (initial SOC) of the rechargeable battery 16 acquired at the departure point, in a case where the vehicle has traveled the route from the departure point to the destination last time (in the past). It should be noted that the total power balance amount Pbts of the rechargeable battery 16 is positive when initial SOC<target SOC, and negative when initial SOC≧target SOC.

Subsequently, in Step S105, the operation condition setting unit 72 calculates a total electricity generating power amount Pge of the generator 54 used to charge the rechargeable battery 16 in a case where the vehicle travels the route from the departure point to the destination. Herein, the total electricity generating power amount Pge of the generator 54 used to charge the rechargeable battery 16 is calculated in accordance with Equation (4) below in order to achieve the total power balance amount Pbts set in Step S104. In Equation (4) below, $\eta_3$ is a conversion coefficient that takes into account the efficiency until the power of the generator 54 is converted to the power of the rechargeable battery 16.

(Mathematical Formula 4)

$$Pge=\eta_3(Pevs+Pbs+Pbts) \quad (4)$$

Subsequently, in Step S106, the operation condition setting unit 72 determines whether it is possible to set the operation conditions of the engine 50 and the generator 54 to achieve the total electricity generating power amount Pge under the condition of the power threshold value Pc that is chosen (tentatively set). Herein, a range equal to or larger than the power threshold value Pc is given as the range of the required vehicle power Pv0 to operate the engine 50, and an electricity generating power Pch(i) of the generator 54 used to charge the rechargeable battery 16 is set with respect to the power bandwidth Pcup(i) (see FIG. 7) equal to or larger than the power threshold value Pc to operate the engine 50. In the description below, tcup(i) is given as the frequency corresponding to the power bandwidth Pcup(i).

Figure 8:
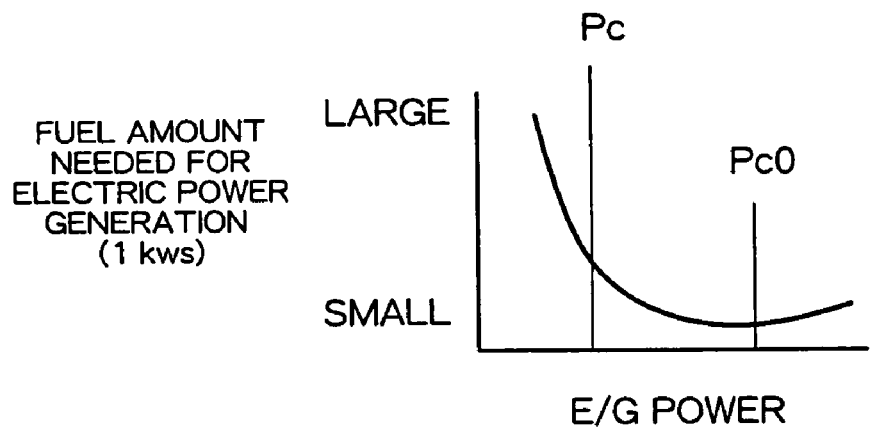
FIG. 8 is a view showing an example of the characteristic of a fuel consumption rate with respect to power of the engine in a case where the rotational speed and the torque of the engine are positioned on the optimal fuel consumption line.
Figure 9:
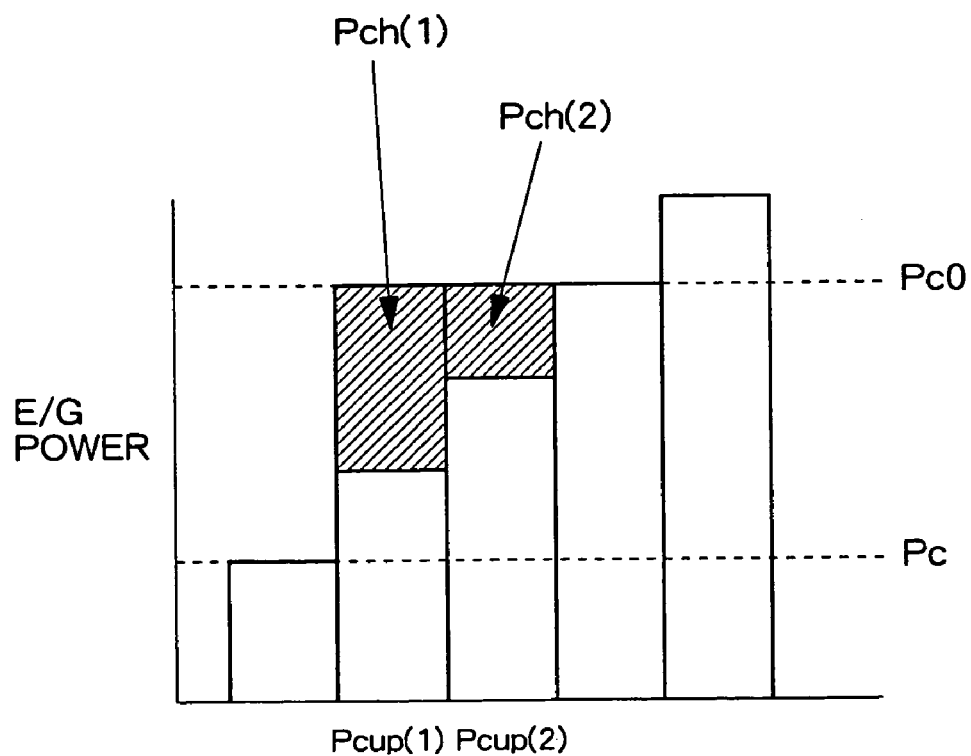
FIG. 9 is a view used to describe processing to set electricity generating power of a generator used to charge a rechargeable battery.

In a case where the rotational speed Ne and the torque Te of the engine 50 are positioned on the optimal fuel consumption line described above, the characteristic of a fuel amount (fuel consumption rate) needed to generate electric power of 1 kws with respect to the power (traveling power) of the engine 50 is represented, for example, by a curve as is shown in FIG. 8. A region where electric power is generated by driving the engine 50 is determined according to the characteristic of FIG. 8. According to the characteristic shown in FIG. 8, for example, the fuel consumption rate becomes the minimum when the power of the engine 50 is Pc0 (Pc0>Pc). Accordingly, as is shown in FIG. 9, the electricity generating power Pch(i) that establishes Pcup(i)+Pchi(i)=(or ≦) Pc0 is set for each power bandwidth Pcup(i) that is larger than Pc and smaller than Pc0. In other words, in each power bandwidth Pcup(i) that is larger than Pc and smaller than Pc0, the power of the engine 50 is set to Pc0 so as to minimize the fuel consumption rate of the engine 50. FIG. 9 shows a case where the electricity generating powers Pch(1) and Pch(2) are set, respectively, for the power bandwidths Pcup(1) and Pcup(2) that are larger than Pc and smaller than Pc0. When Equation (5) below is established, the total electricity generating power amount Pge can be supplied by the electricity generating powers Pch(1) and Pch(2) alone.

(Mathematical Formula 5)

$$Pge\leq\eta_3(Pch(1)\times tcup(1)+Pch(2)\times tcup(2)) \quad (5)$$

In a case where Equation (5) above is established (in a case where the total electricity generating power amount Pge can be supplied by the electricity generating powers Pch(1) and Pch(2) alone), the determination result in Step S106 is YES. In this case, it is possible to set the power of the engine 50 and the generated electric power of the generator 54 in each power bandwidth Pcup(i) in such a manner that the SOC of the rechargeable battery 16 after the vehicle has traveled the route from the departure point to the destination achieves the target SOC at the destination (the total power balance amount of the rechargeable battery 16 becomes the total power balance amount Pbts set in Step S104) under the condition of the chosen power threshold value Pc. Then, the electricity generating power Pch(1) with respect to the power bandwidth Pcup(1), for example, which is the lower power bandwidth, is determined again so that the right side and the left side of Equation (5) above become equal. The flow then proceeds to Step S107. In this instance, Pch(1) is expressed by Equation (6) as follows: (
Mathematical Formula 6)

$$Pch(1)=(Pge/\eta_3-Pch(2)\times tcup(2))/tcup(1) \qquad (6).$$

Figure 10:
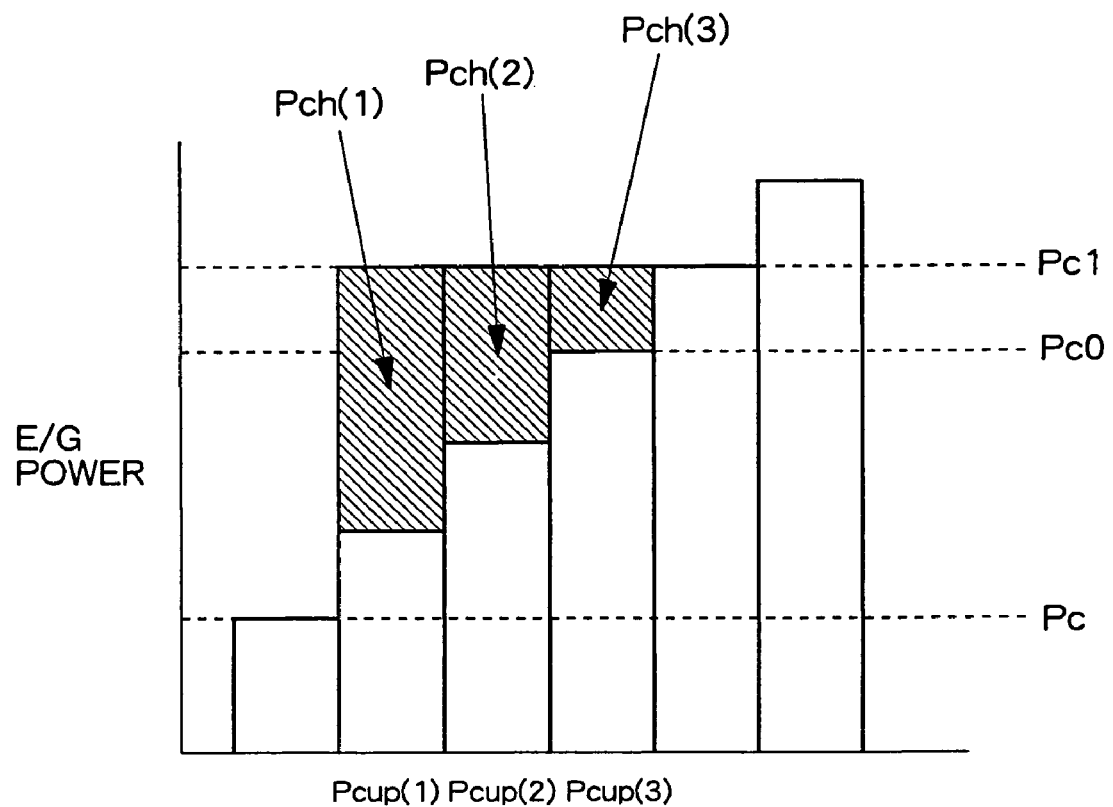
FIG. 10 is another view used to describe processing to set electricity generating power of the generator used to charge the rechargeable battery.

Meanwhile, in a case where Equation (5) above is not established (in a case where the total electricity generating power amount Pge cannot be supplied by the electricity generating powers Pch(1) and Pch(2) alone), the range of the power bandwidth Pcup(i) for which the generated electric power Pch(i) is set is broadened, and as is shown in FIG. 10, the electricity generating power Pch(i) is set again so that Pcup(i)+Pch(i)=(or $\leqq$) Pc1 is established with respect to each power bandwidth Pcup(i) that is larger than Pc and smaller than Pc1 (Pc1>Pc0). In other words, the power of the engine 50 is set again to Pc1 in each power bandwidth Pcup(i) that is larger than Pc and smaller than Pc1. FIG. 10 shows a case where the electricity generating powers Pch(1), Pch(2), and Pch(3) are set, respectively, with respect to the power bandwidths Pcup(1), Pcup(2), and Pcup(3) that are larger than Pc and smaller than Pc1. Subsequently, whether Equation (7) below is established (whether the total electricity generating power amount Pge can be supplied by the electricity generating power Pch(1), Pch(2), and Pch(3)) is determined.
(Mathematical Formula 7)

$$Pge \leqq \eta_3(Pch(1) \times tcup(1) + Pch(2) \times tcup(2) + Pch(3) \times tcup(3)) \qquad (7)$$

In a case where Equation (7) above is established, the determination result in Step S106 is also YES. In this case, too, it is possible to set the power of the engine 50 and the generated electric power of the generator 54 in each power bandwidth Pcup(i) in such a manner that the SOC of the rechargeable battery 16 after the vehicle has traveled the route from the departure point to the destination achieves the target SOC at the destination (the total power balance amount of the rechargeable battery 16 becomes the total power balance amount Pbts set in Step S104) under the condition of the chosen power threshold value Pc. Then, the electricity generating power Pch(1) for the power bandwidth Pcup(1) is determined again so that the right side and the left side of Equation (7) above become equal. The flow then proceeds to Step S107.

Meanwhile, in a case where Equation (7) is not established, the range of the power bandwidth Pcup(i) for which the electricity generating power Pch(i) is set is broadened further to determine whether the total electricity generating power amount Pge can be supplied by the electricity generating power Pch (i). It should be noted, however, that it is determined that the total electricity generating power amount Pge cannot be supplied by the electricity generating power Pch(i) in a case where the total electricity generating power amount Pge cannot be supplied unless the power of the engine 50 in the power bandwidth Pcup(i) exceeds the preset allowance value or in a case where the total electricity generating power amount Pge cannot be supplied unless the electricity generating power Pch(i) of the generator 54 in the power bandwidth Pcup(i) exceeds the preset allowance value. The result of determination in Step S106 is therefore NO. In this case, it is determined that it is impossible to set the power of the engine 50 and the generated electric power of the generator 54 in each power bandwidth Pcup(i) in such a manner that the SOC of the rechargeable battery 16 after the vehicle traveled the route from the departure point to the destination reaches the target SOC (the total power balance amount of the rechargeable battery 16 becomes the total power balance amount Pbts set in Step S104). The flow then proceeds to Step S108.

Figure 11:
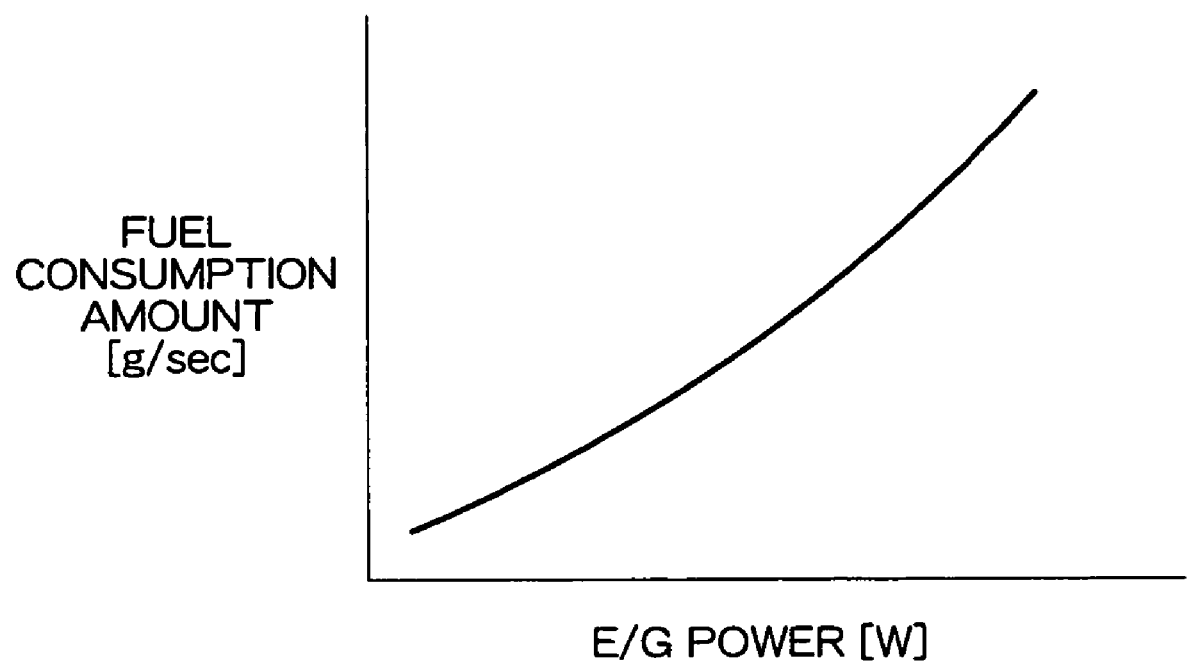
FIG. 11 is a view showing one example of the characteristic of a fuel consumption amount with respect to power of the engine.

In Step S107, the operation condition setting unit 72 calculates a total fuel consumption amount Fu of the engine 50 in a case where the vehicle travels the route from the destination to the destination using the power bandwidth Pcup(i) equal to or larger than the power threshold value Pc (the range of the required vehicle power Pv0 to operate the engine 50), the power of the engine 50 in the power bandwidth Pcup(i) set in Step S106, and the frequency tcup(i) (power frequency distribution) in the power bandwidth Pcup(i). Herein, a total power amount Ps(1) of the engine 50 in a case where the vehicle travels the route from the departure point to the destination with respect to the power threshold value Pc=Pc(1) is expressed by Equation (8) below. The total fuel consumption amount Fu(1) of the engine 50 with respect to the power threshold value Pc=Pc(1) is calculated using Equation (8) below and the characteristic of the fuel consumption amount with respect to the power of the engine 50 (see FIG. 11).
(Mathematical Formula 8)

$$Ps(1)=(Pcup(1)+Pch(1))\times tcup(1)+(Pcup(2)+Pch(2))\times tcup(2)+\dots+Pch(m)\times tcup(m) \qquad (8)$$

Subsequently, in Step S108, the operation condition setting unit 72 determines whether it has selected (tentatively set) the power threshold value Pc with respect to all the threshold value candidates [Pc(1), Pc(2), ..., Pc(n)]. In a case where the power threshold value Pc has not been chosen for all the threshold candidates (in a case where the determination result in Step S108 is NO), the flow returns to Step S102. Then, processing in Step S102 through S107 is repeated by changing the power threshold value Pc (the range of the required vehicle power Pv0 to operate the engine 50) to be chosen (tentatively set). Meanwhile, in a case where the power threshold value Pc has been chosen for all the threshold candidates (in a case where the determination result in Step S108 is YES), the flow proceeds to Step S109.

In Step S109, the operation condition setting unit 72 determines the power threshold value Pc (the lower limit value of the range of the required vehicle power Pv0) chosen (tentatively set) in a case where the total fuel consumption amount is the minimum among all the total fuel consumption amounts of the engine 50 calculated in Step S108 to be the lower limit value of the range of the required vehicle power Pv0 to operate the engine 50. After the power threshold value Pc is determined, the operation control unit 60 controls the operations of the engine 50, the motor 10, and the generator 54 according to the power threshold value Pc as described above. Herein, in a case where the required vehicle power Pv0 is included in the power bandwidth Pcup(i) equal to or lager than the power threshold value Pc, the engine 50 is operated and the electricity generating power of the generator 54 used to charge the rechargeable battery 16 is set to the electricity generating power Pch(i) that is set when the power threshold value Pc is determined. In short, the power of the engine 50 is controlled to be Pcup(i)+Pch(i). According to the processing described above, the power threshold value Pc (the engine operation condition) can be set for, in a case where the vehicle travels the route from the departure point to the destination, controlling the SOC of the rechargeable battery 16 to achieve the target SOC at the destination (controlling the total power balance amount of the rechargeable battery 16 to become the total power balance amount Pbts set in Step S104) and minimizing the total fuel consumption amount of the engine 50.

According to the processing described above, the charge-discharge balance of the rechargeable battery 16 is calculated using the power (electric power) balance. However, the charge-discharge balance of the rechargeable battery 16 may be calculated using a current balance. For example, a current of the rechargeable battery 16 is expressed by a function f(P) of the power (electric power) P of the rechargeable battery 16. Herein, f(P)≧0 when P≧0, and f(P)<0 when P<0.

In this case, a total current amount (a total current amount comparable to regeneration) Ibs to be charged to the rechargeable battery 16 by the regenerative operation of the motor 10 in a case where the vehicle travels the route from the departure point to the destination set in Step S101 is expressed by Equation (9) below using the function f(P). In addition, a total current amount (a total current amount needed for the EV travel) Ievs that is supplied to the motor 10 from the rechargeable battery 16 in a case where the vehicle travels the route from the departure point to the destination set in Step S103 is expressed by Equation (10) below using the function f(P):
(Mathematical Formula 9)

$$Ibs = \Sigma f(\eta_1 \cdot Pb(i)) \times tb(i) \quad (9)$$

$$Ievs = \Sigma f(\eta_2 \cdot Pev(i)) \times tev(i) \quad (10).$$

A total generated current amount Ige of the generator 54 used to charge the rechargeable battery 16 in a case where the vehicle travels the route from the departure point to the destination set in Step S105 is expressed by Equation (11) as follows:

$$Ige = Ievs + Ibs + Ibts \quad (11).$$

It should be noted that in Equation (11) above, Ibts is a total current balance amount of the rechargeable battery 16 in a case where the vehicle travels the route from the departure point to the destination set in Step S104, and for example, it can be set from a deviation of the target SOC of the rechargeable battery 16 at the destination and the SOC (initial SOC) of the rechargeable batter 16 acquired at the departure point of this travel. Herein, Ibts is positive when initial SOC<target SOC, and negative when initial SOC≧target SOC. In Step S106, whether it is possible to achieve the total generated current amount Ige with the electricity generating power Pch(i) using the function f(P).

Also, in the processing described above, it is possible to set the target SOC of the rechargeable battery 16 at the destination to have a range to some extent in Step S104. The total power balance amount Pbts of the rechargeable battery 16 can be also set to have a range to some extent.

In this embodiment as described above, the power threshold value Pc for controlling the charge-discharge balance of the rechargeable battery 16 in a case where the vehicle travels the route, that is, the energy balance between the generated power and the generated electric power of the motor 10 and the generator 54, to be at the preset value (or to fall within the preset range) is set according to the power frequency distribution of the vehicle over the entire route. The EV travel by the motor 10 is then executed when the required vehicle power Pv0 is larger than 0 and smaller than the power threshold value Pc, and the engine 50 is operated when the required vehicle power Pv0 is equal to or larger than the power threshold value Pc. Hence, not only is it possible to allow the vehicle to travel using the power of the engine 50 under a high combustion efficiency condition, but it is also possible to allow the vehicle to travel using the power of the motor 10 alone by stopping the operation of the engine 50 under a low combustion efficiency condition while preventing the SOC (remaining battery capacity) of the rechargeable battery 16 from increasing or decreasing exceedingly. Consequently, not only is it possible to control the SOC of the rechargeable battery 16 when the vehicle arrives at the destination to be at a desired value (or to fall within a desired range), but it is also possible to enhance the fuel consumption of the engine 50. Hence, according to this embodiment, the operations of the engine 50, the motor 10, and the generator 54 can be controlled more appropriately.

Further, in this embodiment, the power consumption of the engine 50 can be further enhanced by setting the power threshold value Pc for, in a case where the vehicle travels the route, setting the energy balance to be at the preset value (or to fall within the preset range) and minimizing the total fuel consumption amount Fu of the engine 50.

Also, in this embodiment, in a case where the SOC of the rechargeable battery 16 drops below the specified range while the vehicle is traveling, it is possible to appropriately prevent the SOC of the rechargeable battery 16 from reducing excessively by generating electric power by means of the generator 54 by controlling the engine 50 to generate power even when the required vehicle power Pv0 is smaller than the power threshold value Pc.

Also, in this embodiment, with respect to the power frequency distribution used to set the power threshold value Pc, it is sufficient to store the frequency tb(i) in each of the power bandwidths Pb(i), which are the vehicle power Pv divided in advance. Hence, a data storage amount needed to set the power threshold value Pc can be reduced markedly. In addition, a variance of a travel resistance caused, for example, by a slope, can be incorporated into the data as a power variance by storing the frequency of the vehicle power (traveling power). According, information about a road environment condition, such as a road surface gradient, is unnecessary, which can also decrease the data storage amount. Meanwhile, in Patent Document 1, the vehicle speed pattern is estimated zone by zone for the path divided into plural zones. It is, however, difficult to detect the travel resistance, such as slope information, from the vehicle speed pattern alone. In Patent Document 1, the road environment information, various vehicle states, and an operation history of the driver are necessary to estimate the travel resistance, which results in a significant increase of the data storage amount.

Also, in Patent Document 1, whether the vehicle is to travel by operating the motor or by operating the engine is set zone by zone for the path divided into plural zones. Accordingly, in a case where a region in which the required vehicle power is low and a region in which the required vehicle power is high are present together in the same zone, either the vehicle travels using a power of the engine even under a condition where the combustion efficiency of the engine is low, or the vehicle travels using a power of the motor even under a condition where the combustion efficiency of the engine is high. In contrast to this configuration, in this embodiment, it is possible to set either that the vehicle is to travel by the EV travel using the power of the motor 10, or by the travel using the power of the engine 50, according to a comparison between the required vehicle power Pv0 and the power threshold value Pc. Hence, not only can the engine 50 be operated in a reliable manner under a high combustion efficiency condition, but) also the operation of the engine 50 can be stopped in a reliable manner under a low combustion efficiency condition.

Also, in Patent Document 1, the fuel consumption varies markedly depending on in which zone the vehicle travels by operating the motor and in which zone the vehicle travels by operating the engine. In Patent Document 1, it is disclosed to choose a zone in which the engine is operated at an operation point at the lowest efficiency within the schedule zones immediately before the continued regenerative zone, as the travel zone in which the vehicle travels by operating the motor. However, in order to enhance the fuel consumption for the entire route, besides the zone immediately before the continued regenerative zone, it is also necessary to determine where along the entire route the engine should be operated and where along the entire route the vehicle should travel by operating the motor using some conditions. In contrast to this configuration, in this embodiment, by setting a range of the required vehicle power Pv0 to execute the EV travel by the motor 10 and the range of the required vehicle power Pv0 to operate the engine 50 according to the power frequency distribution of the vehicle for the entire route, not only is it possible to operate the engine 50 only where the combustion efficiency is high to the extent possible, but it is also possible to control the vehicle to travel by the motor 10 alone where the combustion efficiency is low while the vehicle is traveling the route. Hence, fuel consumption for the entire route can be enhanced.

Another example of the configuration of this embodiment will now be described.

In this embodiment, by dividing the route from the departure point to the destination into plural travel zones for the power frequency distribution storage unit 66 to store the power frequency distribution (the value of the frequency tb(i) in each power bandwidth Pb(i)) for each travel zone, the power frequency distribution predicting unit 68 becomes able to predict the power frequency distribution for each travel zone in a case where the vehicle travels the route from the departure point to the destination. Herein, the route from the departure point to the destination can be divided into zones in reference to landmarks, such as intersections. The operation condition setting unit 72 may correct the range of the required vehicle power Pv0 to operate the engine 50 (the power threshold value Pc) each time the vehicle travels in the respective travel zones. Hereinafter, an operation in a case where the power threshold value Pc is corrected will be described using the flowchart of FIG. 12.

Figure 5:
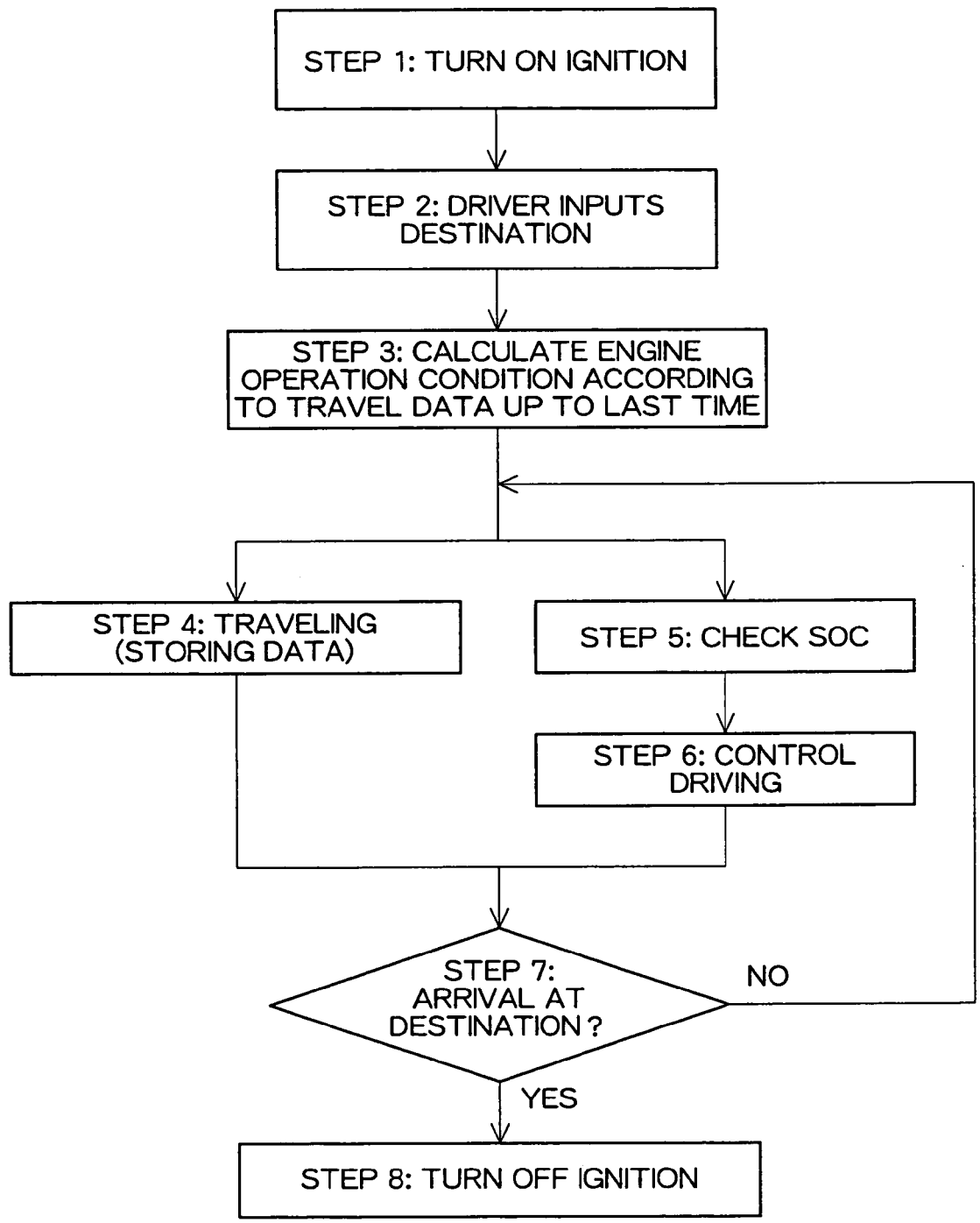
FIG. 5 is a flowchart detailing an operation in a case where the vehicle travels from a departure place to a destination.
Figure 12:
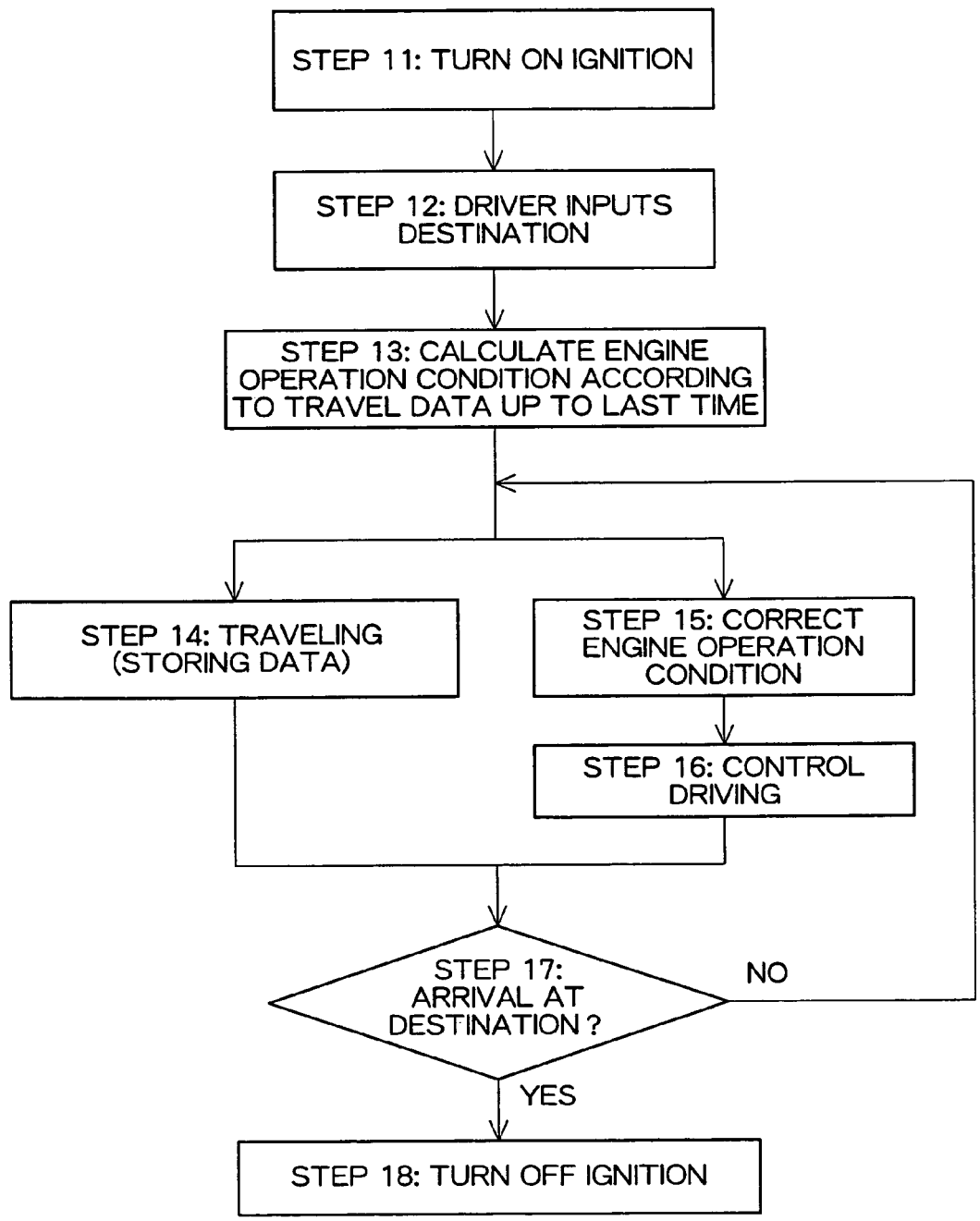
FIG. 12 is a flowchart detailing another operation in a case where the vehicle travels from a departure point to a destination.

Steps S11, S12, and S16 through S18 of the flowchart of FIG. 12 are the same as Steps S1, S2, and S6 through S8 of the flowchart in FIG. 5, respectively. In Step S13, the power frequency distribution in a case where the vehicle travels the route from the departure point to the destination is predicted by synthesizing the power frequency distributions of the respective travel zones stored in the power frequency distribution storage unit 66. Subsequently, as in Step S3, the range of the required vehicle power Pv0 necessary to operate the engine 50 (the power threshold value Pc) is set by the operation condition setting unit 72 according to the power frequency distribution thus predicted.

In Step S14, the power frequency distribution stored in the power frequency distribution storage unit 66 is updated for each travel zone while the vehicle is traveling according to the vehicle power Pv acquired by the power acquiring unit 64. Herein, in the power frequency distribution corresponding to a travel zone in which the vehicle is traveling, the value of the frequency tb(i) corresponding to the power bandwidth Pb(i) including the vehicle power Pv (the filtered vehicle power Pfv) is updated.

Figure 13:
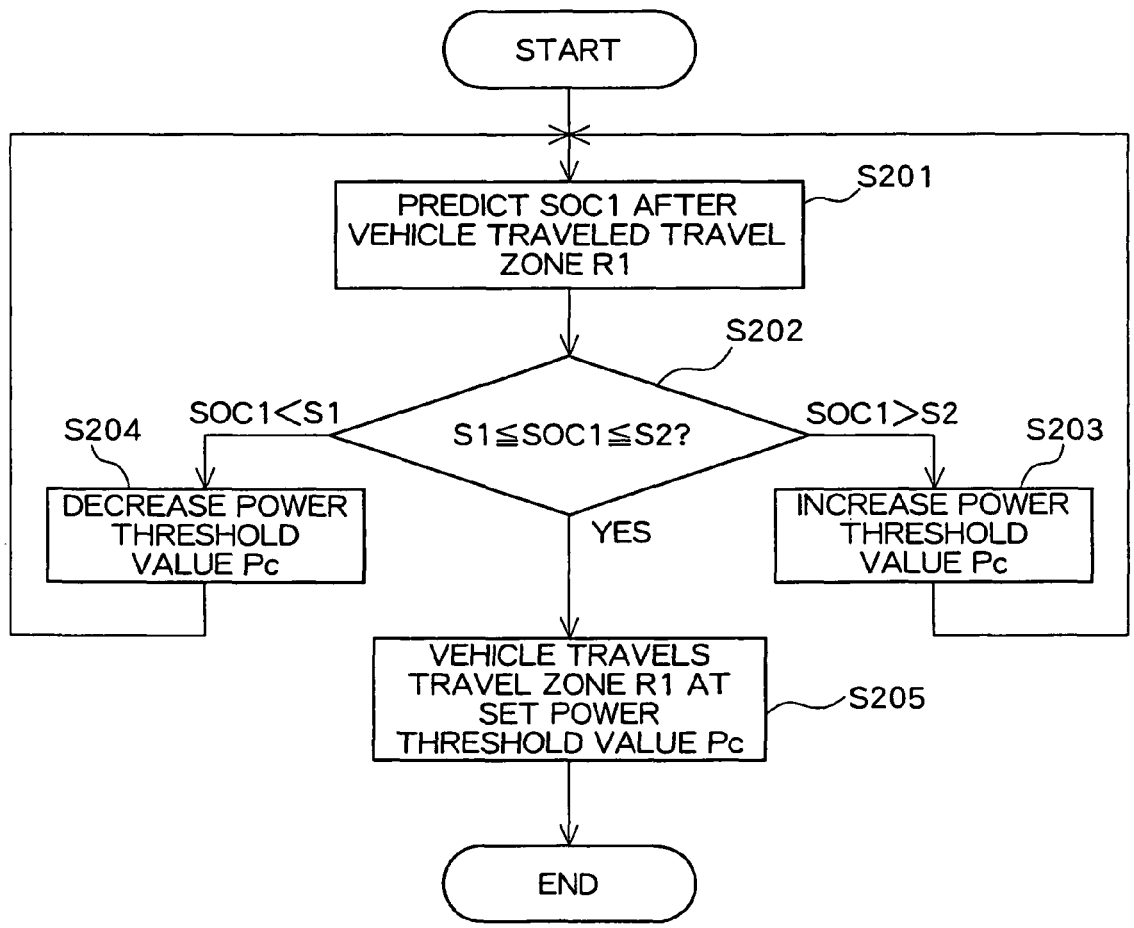
FIG. 13 is a flowchart detailing processing to correct the lower limit value of the range of the required vehicle power to operate the engine.

Also, in Step S15, the range of the required vehicle power Pv0 necessary to operate the engine 50 (the engine operation condition) is corrected by the operation condition setting unit 72 each time the vehicle travels the respective travel zones. Hereinafter, the processing by the operation condition setting unit 72 to correct the range of the required vehicle power Pv0 to operate the engine 50 (the power threshold value Pc) will be described in detail using the flowchart of FIG. 13.

Initially, in Step S201, the operation condition setting unit 72 predicts the SOC of the rechargeable battery 16 after the vehicle traveled a travel zone R1 that the vehicle is to travel using a power frequency distribution P1 corresponding to the travel zone R1 and the power threshold value Pc currently set.

Herein, a total current amount (a total current amount comparable to regeneration). Ileg to be charged to the rechargeable battery 16 by the regenerative operation of the motor 10 when the vehicle travels in the travel zone R1 is expressed by Equation (12) below. Also, a total current amount (a total current amount needed for the EV travel) Ilevs to be supplied from the rechargeable battery 16 to the motor 10 when the vehicle travels in the travel zone R1 is expressed by Equation (13) below. In addition, a total generated current amount Ilegs of the generator 54 to be used to charge the rechargeable battery 16 in a case where the vehicle travels the travel zone R1 is expressed by Equation (14) below.
(Mathematical Formula 10)

$$Ileg = \Sigma f(\eta_1 \cdot Pb(i)) \times tb(i) \tag{12}$$

$$Ilevs = \Sigma f(\eta_2 \cdot Pev(i)) \times tev(i) \tag{13}$$

$$Ilegs = \Sigma f(\eta_3 \cdot Pch(i)) \times tcup(i) \tag{14}$$

Also, a total current balance amount (the discharge side is negative and the charging side is positive) ΔI of the rechargeable battery 16 in a case where the vehicle travels the travel zone R1 is expressed by Equation (15) as follows:

$$\Delta I = Ilevs + Ileg + Ilegs \tag{15}$$

Hence, the operation condition setting unit 72 becomes able to calculate a remaining battery capacity variance ΔSOC of the rechargeable battery 16 in a case where the vehicle travels the travel zone R1 in accordance with Equation (16) below. It then becomes possible to calculate a remaining battery capacity SOC1 of the rechargeable battery 16 after the vehicle has traveled the travel zone R1 from the ΔSOC and the current remaining battery capacity of the rechargeable battery 16. In Equation (16) below, Kb is a coefficient used to convert the total current amount to the SOC variance amount according to the battery capacity.

$$\Delta SOC = \Delta I / Kb \tag{16}$$

In view of the foregoing, it is possible to calculate the SOC1 in accordance with Equation (17) below. In Equation (17) below, SOC0 is the current SOC.

$$SOC1 = SOC0 + \Delta SOC \tag{17}$$

Subsequently, in Step S202, the operation condition setting unit 72 determines whether the SOC1 thus calculated falls within the specified range of S1 to S2 inclusive, that is, whether the charge-discharge balance of the rechargeable battery 16 (a total power balance amount between generated power and generated electric power of the motor 10 and the generator 54) in a case where the vehicle travels the travel zone R1 falls within the preset range. In a case where SOC1>S2 in Step S202, the value of the power threshold value Pc is increased in Step S203 and the flow returns to Step S201. Then, a calculation is performed repetitively until the remaining battery capacity SOC1 of the rechargeable battery 16 after the vehicle has traveled through the travel zone R1 establishes S1≦SOC1≦S2. Also, in a case where SOC<S1 in Step S202, the value of the power threshold Pc is reduced in Step S204, and the flow returns to Step S201. Then, a calculation is performed repetitively until the remaining battery capacity SOC1 of the rechargeable battery 16 after the vehicle has traveled through the travel zone R1 establishes $S1 \leq SOC1 \leq S2$. Meanwhile, in a case where $S1 \leq SOC1 \leq S2$ is established in Step S202, the flow proceeds to Step S205 and the operation of the engine 50 is controlled according to the power threshold value Pc in a case where $S1 \leq SOC1 \leq S2$ is established for the vehicle to travel in the travel zone R1. According to the processing described above, in a case where it is determined that the SOC of the rechargeable battery 16 after the vehicle has traveled through the travel zone R1 falls outside the specified range (the total power balance amount of the rechargeable battery 16 falls outside the preset range) with the power threshold value Pc (under the engine operation condition) currently set, the power threshold value Pc is set again so that the SOC of the rechargeable battery 16 after the vehicle has traveled through the travel zone R1 falls within the specified range (the total power balance amount of the rechargeable battery 16 falls within the preset range).

While the vehicle is traveling in the travel zone R1, the power frequency distribution P2 in a case where the vehicle travels the following travel zone R2 is predicted by synthesizing the power frequency distributions corresponding to the respective travel zones following the travel zone R1, which are stored in the power frequency distribution storage unit 66. Then, as in Step S13, the power threshold value Pc12 is set by the operation condition setting unit 72 according to the power frequency distribution P2 thus predicted. It should be noted, however, that when the power threshold value Pc12 is set while the vehicle is traveling the travel zone R1, the SOC1 is used as the initial SOC. Further, after the vehicle has traveled through the travel zone R1, as in Step S13, the power threshold value Pc2 is set by the operation condition setting unit 72 according to the power frequency distribution P2. Herein, the SOC of the rechargeable battery 16 immediately after the vehicle has traveled through the travel zone R1 is used as the initial SOC. In a case where the power threshold value Pc2 has not been set before the vehicle starts to travel in the travel zone R2, the operation of the engine 50 is controlled according to the power threshold value Pc12. In a case where the power threshold value Pc2 has been set, the operation of the engine 50 is controlled according to the power threshold value Pc2.

According to this example of the configuration, in a case where it is determined that the charge-discharge balance of the rechargeable battery 16, that is, the energy balance between generated power and generated electric power of the motor 10 and the generator 54 in a case where the vehicle travels in the travel zone R1, falls outside the preset range with the power threshold value Pc currently set, the power threshold value Pc is set again so that the charge-discharge balance (energy balance) of the rechargeable battery 16 falls within the preset range in a case where the vehicle travels the travel zone R1. Accordingly, it becomes possible to set the power threshold value Pc correspondingly to a variance of the travel conditions of the vehicle. Hence, even when the travel condition of the vehicle varies, not only can the SOC of the rechargeable battery 16 when the vehicle arrives at the destination achieve a desired value, (or fall within a desired range), but also the fuel consumption of the engine 50 can be enhanced.

In the description above, the route predicting unit 62 predicts the route in a case where the vehicle travels from the departure point to the destination from the route set by the navigation system 36. However, according to this embodiment, the month, the day of the week, and the departure time when the vehicle traveled from the departure point to the destination in the past may be stored in the electronic control unit 42 in correlation with the departure point and the destination, so that the route predicting unit 62 first predicts the destination by reading out the destination corresponding to the month, the day of the week, and the departure time, and the departure point when the vehicle is to depart from the departure point, and it then predicts the route from the departure point to the destination. Also, in this embodiment, a travel history (for example, the travel distance, a steering operation amount, etc.) when the vehicle traveled the route from the departure point to the destination in the past may be stored in the electronic control unit 42, so that a change of the destination can be predicted by comparing the travel state of the vehicle while it is traveling (for example, a travel distance, a steering manipulation amount, etc.) with the travel history stored in the electronic control unit 42. In a case where a change of the destination is predicted, the power threshold value Pc is set again according to the power frequency distribution or the pre-determined reference power threshold value Pc is set again.

Also, in this embodiment, by configuring in such a manner that the power frequency distribution storage unit 66 stores the power frequency distribution (the value of the frequency tb(i) in each power bandwidth Pb(i)) at every preset time or every preset distance, the power frequency distribution predicting unit 68 becomes able to predict the power frequency distribution in a case where the vehicle travels the route at every preset time or every preset distance. In addition, in this embodiment, the power frequency distribution storage unit 66 may store the power frequency distributions by sorting them according to the distribution profiles. For example, in a case where the power frequency distribution storage unit 66 stores the power frequency distributions at every preset time or every preset distance, power frequency distributions of a similar profile can be stored collectively. Herein, it is possible to sort the power frequency distributions, for example, to a distribution in which the frequency tb(i) concentrates in a low power bandwidth Pb(i), a distribution in which the frequency tb(i) concentrates in a high power bandwidth Pb(i), and an intermediate distribution between these two distributions.

Also, in this embodiment, the power acquiring unit 64 may acquire the vehicle power Pv together with the vehicle travel state, such as the rotational speed Ne and the torque Te of the engine 50, the rotational speed Nm and the torque Tm of the motor 10, and the rotational speed Ng and the torque Tg of the generator 54 (or at least one of the foregoing). This configuration enables the power frequency distribution storage unit 66 to store the vehicle travel state in correlation with the power bandwidth Pb(i) in which the vehicle power Pv acquired together therewith is included.

In this case, the operation condition setting unit 72 determines in Step S106 whether the rotational speed Ne of the engine 50 and the rotational speed Ng or the torque Tg of the generator 54 (or at least one of the forgoing) exceed the preset corresponding upper limit values (limit values) by the electricity generating power Pch(i) of the generator 54 in each power bandwidth Pcup(i) when setting the electricity generating power Pch(i) of the generator 54 (and the power of the engine 50, Pcup(i)+Pch(i)) used to charge the rechargeable battery 16 with respect to each power bandwidth Pcup(i) (see FIG. 6) equal to or larger than the power threshold value Pc. Herein, it is possible to predict the rotational speed Ne of the engine 50 and the rotational speed Ng or the torque Tg of the generator 54 in a case where the electricity generating power Pch(i) is set in the power bandwidth Pcup(i) according to the vehicle travel state stored in correlation with the power bandwidth Pcup(i), that is, the rotational speed Ne and the torque Te of the engine 50 and the rotational speed Ng and the torque Tg of the generator 54 (or at least one of the foregoing). In a case where the rotational speed Ne of the engine 50 and the rotational speed Ng or the torque Tg of the generator 54 (or at least one of the foregoing) that have been predicted are equal to or lower than the corresponding upper limit values in each power bandwidth Pcup(i), it is determined whether the total electricity generating power amount Pge can be supplied by a sum of the electricity generating powers Pch(i) that are currently set. In other words, it is determined whether the SOC of the rechargeable battery 16 after the vehicle has traveled the route from the departure point to the destination can achieve the target SOC at the destination (whether an energy balance between the generated power and the generated electric power of the motor 10 and the generator 54 in a case where the vehicle travels the route can be a total power balance amount Pbts) under the conditions of the power of the engine 50, Pcup(i)+Pch(i), and the electricity generating power Pch(i) of the generator 54 currently set. Meanwhile, in a case where at least one of (or all of) the rotational speed Ne of the engine 50 and the rotational speed Ng or the torque Tg of the generator 54 that have been predicted exceeds the corresponding upper limit in a given power bandwidth Pcup(i), the electricity generating power Pch(i) in this power bandwidth Pcup(i) is reset to 0. Alternatively, the electricity generating power Pch(i) (and the power of the engine 50, Pcup(i)+Pch(i)) is calculated again according to the vehicle travel state (the rotational speed Ne and the torque Te of the engine 50, the rotational speed Ng and the torque Tg of the generation 54, etc.) stored in correlation with this power bandwidth Pcup(i), so that the rotational speed Ne of the engine 50 and the rotational speed Ng or the torque Tg of the generator 54 (or at least one of the foregoing) are limited to the corresponding upper limit values or below in this power bandwidth Pcup(i). Then, it is determined whether the total electricity generating power amount Pge can be supplied by a sum of the electricity generating powers Pch(i) thus calculated again.

According to this configuration, it is possible to set the power threshold value Pc in such a manner that the rotational speed Ne of the engine 50 and the rotational speed Ng or the torque Tg of the generator 54 (or at least one of the foregoing) are limited to the corresponding upper limit values or below. It is thus possible to control the SOC of the rechargeable battery 16 when the vehicle arrives at the destination to achieve a desired value (or to fall within a desired range) while limiting the rotational speed Ne of the engine 50 and the rotational speed Ng or the torque Tg of the generator 54 (or at least one of the foregoing).

Also, in this embodiment, the power acquiring unit 64 may acquire the vehicle power Pv together with a physical amount (vehicle travel state) relative to in-vehicle sounds, such as an in-vehicle sound pressure (detected, for example, by an unillustrated microphone). The power frequency distribution storage unit 66 may then store the vehicle travel state relative to in-vehicle sounds in correlation with the power bandwidth Pb(i) in which the vehicle power Pv acquired together therewith is included.

In this case, the operation condition setting unit 72 changes the electricity generating power Pch(i) in Step S106 in response to the in-vehicle sound pressure by calculating the electricity generating power Pch(i) according to the in-vehicle sound pressure (the vehicle travel state relative to the in-vehicle sounds) stored in correlation with the power bandwidth Pcup(i) when setting the electricity generating power Pch(i) of the generator 54 (and the power of the engine 50, Pcup(i)+Pch(i)) to be used to charge the rechargeable battery 16 with respect to each power bandwidth Pcup(i) (see FIG. 6) equal to or larger than the power threshold value Pc. For example, the electricity generating power Pch(i) (and the power of the engine 50, Pcup(i)+Pch(i)) is increased (decreased) in response to an increase (decrease) of the in-vehicle sound pressure stored in correlation with the power bandwidth Pcup(i). Alternatively, it is possible to calculate the electricity generating power Pch(i) (and the power of the engine 50, Pcup(i)+Pch(i)) in such a manner that the in-vehicle sound pressure is limited to the upper limit value (limit value) or below in each power bandwidth Pcup(i) equal to or larger than the power threshold value Pc. Then, it is determined whether the total electricity generating power amount Pge can be supplied by a sum of the electricity generating powers Pch(i) that have been-set. In other words, it is determined whether the SOC of the rechargeable battery 16 after the vehicle has traveled the route from the departure point to the destination can achieve the target SOC (an energy balance between generated power and generated electric power of the motor 10 and the generator 54 in a case where the vehicle travels the route can be a total power balance amount Pbts) under the conditions of the power of the engine 50, Pcup(i)+Pch(i), and the electricity generating power Pch (i) of the generator 54 that are currently set.

According to this configuration, the operations of the engine 50 and the generator 54 are controlled in each power bandwidth Pcup(i) equal to or larger than the power threshold value Pc in such manner that power of the engine 50 and generated electric power of the generator 54 are increased by pre-determined amounts when in-vehicle sounds become louder or power of the engine 50 and generated electric power of the generator 54 are decreased by pre-determined amounts when in-vehicle sounds become lower, by increasing (decreasing) the electricity generating power Pch(i) in response to an increase (a decrease) of the in-vehicle sound pressure. It is thus possible to reduce the influence of noise generated when the generator 54 generates electric power. Also, according to this configuration, by setting the power threshold value Pc so that the in-vehicle sound pressure is limited to the upper limit value or below, it becomes possible to control the SOC of the rechargeable battery 16 when the vehicle arrives at the destination to achieve a desired value (or to fall within a desired range) while limiting the in-vehicle sound pressure. It should be noted that as a physical amount relative to the in-vehicle sounds (vehicle travel state), the rotational speed Ne of the engine 50 (it is determined that the in-vehicle sound pressure increases as the rotational speed increases), the vehicle speed V (it is determined that the in-vehicle sound pressure increases as the vehicle speed increases), a suspension vibration acceleration (it is determined that the in-vehicle sound pressure increases as the vibration acceleration increases), and so forth can be used in addition to the in-vehicle sound pressure.

The embodiments above described a case where the invention is applied to a hybrid vehicle of the configuration shown in FIG. 1. It should be appreciated, however, that the configuration of a hybrid vehicle to which the invention is applicable is not limited to the configuration shown in FIG. 1, and for example, the invention is also applicable to a series-type hybrid vehicle and a parallel-type hybrid vehicle.

While the embodiments of the invention have been described in detail, it should be appreciated that the invention is not limited to these embodiments, and can be implemented in various forms without deviating from the scope of the invention.

The invention claimed is:

1. A hybrid vehicle controller used in a hybrid vehicle capable of driving drive wheels using power generated by at least one of an engine and an electric rotating machine and capable of generating electric power from the electric rotating machine using the power generated by the engine, comprising:
   an operation control unit that controls operations of the engine and the electric rotating machine according to required vehicle power;
   a power frequency distribution predicting unit that predicts a power frequency distribution of the vehicle in a case where the vehicle travels a route; and
   an operation condition setting unit that sets an engine operation condition to control an energy balance between generated power and generated electric power of the electric rotating machine in a case where the vehicle travels the route, so as to fall within a preset range according to the power frequency distribution predicted by the power frequency distribution predicting unit, wherein:
   the operation control unit controls an operation of the engine according to the engine operation condition set by the operation condition setting unit, and
   the power frequency distribution of the vehicle is expressed by a frequency included in each of a plurality of power bandwidths into which a vehicle power is divided in advance.

2. The hybrid vehicle controller according to claim 1, wherein:
   the operation condition setting unit sets the engine operation condition to control the energy balance between the generated power and the generated electric power of the electric rotating machine so as to fall within the preset range and to substantially minimize fuel consumption of the engine in a case where the vehicle travels the route according to the power frequency distribution predicted by the power frequency distribution predicting unit.

3. The hybrid vehicle controller according to claim 1, wherein:
   the operation condition setting unit sets a range of the required vehicle power to operate the engine as the engine operation condition; and
   the operation control unit controls the engine to operate when the required vehicle power falls within the range set by the operation condition setting unit.

4. The hybrid vehicle controller according to claim 3, wherein:
   the operation condition setting unit repetitively performs tentative setting processing to tentatively set the range of the required vehicle power to operate the engine, and determination processing to determine whether it is possible to set engine power and generated electric power of the electric rotating machine in the range of the required vehicle power so that the energy balance falls within the preset range in a case where the vehicle travels the route under a condition of the tentatively set range of the required vehicle power using the power frequency distribution predicted by the power frequency distribution predicting unit while changing the range of the required vehicle power that is set tentatively, and sets the range of the required vehicle power to operate the engine according to a determination result of the determination processing.

5. The hybrid vehicle controller according to claim 4, wherein:
   the operation condition setting unit performs computation processing to compute a fuel consumption amount of the engine in a case where the vehicle travels the route using the engine power and the power frequency distribution predicted by the power frequency distribution predicting unit in a case where it is determined that it is possible to set the engine power and the generated electric power of the electric rotating machine in the range of the required vehicle power tentatively set in the determination processing, and sets the range of the required vehicle power tentatively set in a case where the fuel consumption amount becomes minimum among fuel consumption amounts computed in the computation processing as the range of the required vehicle power to operate the engine.

6. The hybrid vehicle controller according to claim 4, further comprising:
   a power acquiring unit that acquires vehicle power in a case where the vehicle travels the route together with at least one of a torque or a rotational speed of the engine and the electric rotating machine; and
   a power frequency distribution storage unit that stores the power frequency distribution of the vehicle with reference to a history of the vehicle power acquired by the power acquiring unit,
   wherein:
   the power frequency distribution predicting unit uses the power frequency distribution of the vehicle stored in the power frequency distribution storage unit as the power frequency distribution of the vehicle in a case where the vehicle travels the route;
   the power frequency distribution storage unit stores at least one of the torque or the rotational speed of the engine and the electric rotating machine in correlation with a power bandwidth in which the vehicle power acquired together therewith is included; and
   the determination processing is processing to compute the engine power and generated electric power of the electric rotating machine according to at least one of the torque or the rotational speed of the engine and the electric rotating machine stored in correlation with each power bandwidth in such a manner that the rotational speed of the engine and the rotational speed or the torque of the electric rotating machine become equal to or lower than corresponding limit values in each power bandwidth included within the range of the required vehicle power tentatively set, and to determine whether the energy balance falls within the preset range under a condition of the engine power and the generated electric power of the electric rotating machine that have been computed.

7. The hybrid vehicle controller according to claim 4, further comprising:
   a power acquiring unit that acquires vehicle power in a case where the vehicle travels the route together with a physical amount of an in-vehicle sound; and
   a power frequency distribution storage unit that stores the power frequency distribution of the vehicle with reference to a history of the vehicle power acquired by the power acquiring unit,
   wherein:
   the power frequency distribution predicting unit uses the power frequency distribution of the vehicle stored in the power frequency distribution storage unit as the power frequency distribution of the vehicle in a case where the vehicle travels the route;

the power frequency distribution storage unit stores the physical amount of the in-vehicle sound in correlation with the power bandwidth in which the vehicle power acquired together therewith is included; and the determination processing is processing to compute the engine power and the generated electric power of the electric rotating machine for the physical amount of the in-vehicle sound to be equal to or lower than a limit value in each power bandwidth included in the range of the required vehicle power tentatively set, and to determine whether the energy balance falls within the preset range under a condition of the engine power and the generated electric power of the electric rotating machine that have been computed.

8. The hybrid vehicle controller according to claim 1, wherein:

the operation condition setting unit sets a lower limit value of the range of the required vehicle power to operate the engine as the engine operation condition; and the operation control unit controls the engine to operate when the required vehicle power is equal to or larger than the lower limit value of the range set by the operation condition setting unit, and stops the operation of the engine and controls an operation of the electric rotating machine for the electric rotating machine to generate power when the required vehicle power is larger than 0 and smaller than the lower limit value of the range set by the operation condition setting unit.

9. The hybrid vehicle controller according to claim 1, wherein:

the electric rotating machine is capable of sending electric power to, and receiving electric power from, an electric energy storage device that stores electric energy;

the hybrid vehicle controller further comprises an electric energy storage state acquiring unit that acquires an electric energy storage state of the electric energy storage device; and the operation control unit controls the engine to operate regardless of the engine operation condition set by the operation condition setting unit when the electric energy storage state of the electric energy storage device acquired by the electric energy storage state acquiring unit is lower than a specified value.

10. The hybrid vehicle controller according to claim 1, wherein:

the power frequency distribution predicting unit predicts the power frequency distribution of the vehicle in each travel zone for the route divided into plural travel zones; and in a case where it is determined that the energy balance falls outside the preset range in a case where the vehicle travels in a given travel zone under the engine operation condition currently set, the operation condition setting unit sets the engine operation condition again for the energy balance to fall within the preset range in a case where the vehicle travels in the travel zone according to the power frequency distribution in each travel zone predicted by the power frequency distribution predicting unit.

11. The hybrid vehicle controller according to claim 1, further comprising:

a power acquiring unit that acquires vehicle power in a case where the vehicle travels the route, wherein the power frequency distribution predicting unit predicts the power frequency distribution of the vehicle in a case where the vehicle travels the route with reference to a history of the vehicle power acquired by the power acquiring unit.

12. The hybrid vehicle controller according to claim 11, further comprising:

a power frequency distribution storage unit that stores the power frequency distribution of the vehicle with reference to the history of the vehicle power acquired by the power acquiring unit, wherein the power frequency distribution predicting unit uses the power frequency distribution of the vehicle stored in the power frequency distribution storage unit as the power frequency distribution of the vehicle in a case where the vehicle travels the route.

13. The hybrid vehicle controller according to claim 1, further comprising:

a route predicting unit that predicts the route of the vehicle, wherein the power frequency distribution predicting unit predicts the power frequency distribution of the vehicle in a case where the vehicle travels the route according to the route of the vehicle predicted by the route predicting unit.

14. The hybrid vehicle controller according to claim 1, wherein:

an electric motor capable of driving the drive wheels and an electric generator capable of generating electric power using the power generated by the engine are provided as the electric rotating machine.

* * * * *